(12) United States Patent
Rezai et al.

(10) Patent No.: US 10,315,962 B2
(45) Date of Patent: Jun. 11, 2019

(54) SEMI-HUMIC ORGANIC CARBON MATERIAL AND METHODS OF USE THEREOF

(71) Applicant: Actagro, LLC, Fresno, CA (US)

(72) Inventors: Taha Rezai, Clovis, CA (US); John Breen, Fresno, CA (US); Thomas J. Gerecke, Visalia, CA (US); Qingwen He, Fresno, CA (US); Margaret Mae Abercrombie, Fresno, CA (US); Susan Her, Fresno, CA (US); Ryan Dierking, Lafayette, IN (US); Gregory A. Crawford, Fresno, CA (US); Montell L. Bayer, Fresno, CA (US)

(73) Assignee: Actagro, LLC, Fresno, CA (US)

( * ) Notice: Subject to any disclaimer, the term of this patent is extended or adjusted under 35 U.S.C. 154(b) by 0 days.

(21) Appl. No.: 15/796,537

(22) Filed: Oct. 27, 2017

(65) Prior Publication Data
US 2018/0057419 A1   Mar. 1, 2018

Related U.S. Application Data

(63) Continuation of application No. PCT/US2017/016237, filed on Feb. 2, 2017.
(Continued)

(51) Int. Cl.
  *C05G 3/08* (2006.01)
  *C08H 99/00* (2010.01)
  (Continued)

(52) U.S. Cl.
  CPC .............. *C05F 11/02* (2013.01); *B09C 1/08* (2013.01); *C05B 7/00* (2013.01); *C05G 3/08* (2013.01); *C08H 6/00* (2013.01); *C08H 99/00* (2013.01)

(58) Field of Classification Search
  None
  See application file for complete search history.

(56) References Cited

U.S. PATENT DOCUMENTS

| 3,114,625 A | 12/1963 | Higuchi et al. |
| 3,264,084 A * | 8/1966 | Karcher .................. C05C 3/00 422/198 |

(Continued)

FOREIGN PATENT DOCUMENTS

| AU | 2010202336 | 12/2010 |
| CN | 1104197 | 6/1995 |

(Continued)

OTHER PUBLICATIONS

International Search Report and Written Opinion for International Application No. PCT/US2017/016237, dated Jun. 12, 2017. (15 pages).

*Primary Examiner* — Wayne A Langel
(74) *Attorney, Agent, or Firm* — Sheppard Mullin Richter & Hampton LLP

(57) ABSTRACT

This disclosure relates to a semi-humic material, and compositions comprising the same, obtained from leonardite ore and a non-humic organic carbon source and a process for obtaining the same. Also described are methods for maintaining more available nitrogen and phosphorus in the plant root zone and minimizing premature leaching and loss of the nitrogen and/or phosphorus into the atmosphere, surface waters and/or subsurface ground water.

17 Claims, 16 Drawing Sheets

Related U.S. Application Data

(60) Provisional application No. 62/445,686, filed on Jan. 12, 2017, provisional application No. 62/290,879, filed on Feb. 3, 2016.

(51) Int. Cl.
 B09C 1/08 (2006.01)
 C05F 11/02 (2006.01)
 C05B 7/00 (2006.01)
 C08H 7/00 (2011.01)

(56) References Cited

U.S. PATENT DOCUMENTS

| | | | |
|---|---|---|---|
| 4,698,090 A | 10/1987 | Marihart | |
| 4,786,307 A | 11/1988 | Marihart | |
| 4,994,100 A | 2/1991 | Sutton et al. | |
| 5,034,045 A * | 7/1991 | Alexander | C05F 11/02 |
| | | | 71/24 |
| 5,411,569 A * | 5/1995 | Hjersted | C05D 9/02 |
| | | | 210/710 |
| 5,670,345 A | 9/1997 | Srivastava et al. | |
| 6,204,396 B1 * | 3/2001 | Rasmussen | C05D 3/00 |
| | | | 549/392 |
| 6,783,567 B1 * | 8/2004 | Waters | C05D 9/00 |
| | | | 71/24 |
| 2007/0051148 A1 * | 3/2007 | Terenzio | C05F 11/02 |
| | | | 71/24 |
| 2008/0121006 A1 * | 5/2008 | Prasad | C05F 11/02 |
| | | | 71/24 |
| 2008/0216534 A1 | 9/2008 | Karr | |
| 2010/0029982 A1 * | 2/2010 | Prasad | C10G 1/00 |
| | | | 562/485 |
| 2011/0077155 A1 * | 3/2011 | Goodwin | A01N 25/08 |
| | | | 504/101 |
| 2017/0129820 A1 * | 5/2017 | Li | C05F 11/02 |
| 2017/0217847 A1 * | 8/2017 | Gerecke | C05F 11/02 |

FOREIGN PATENT DOCUMENTS

| | | |
|---|---|---|
| EP | 0164908 | 12/1985 |
| SU | 1428309 | 10/1988 |

* cited by examiner

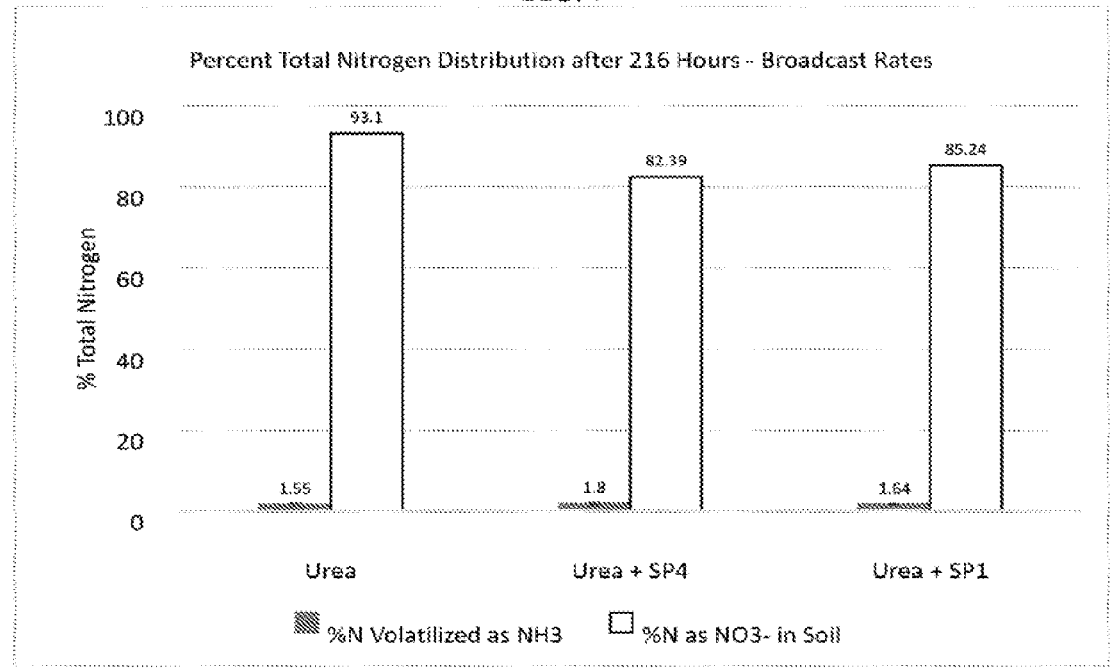
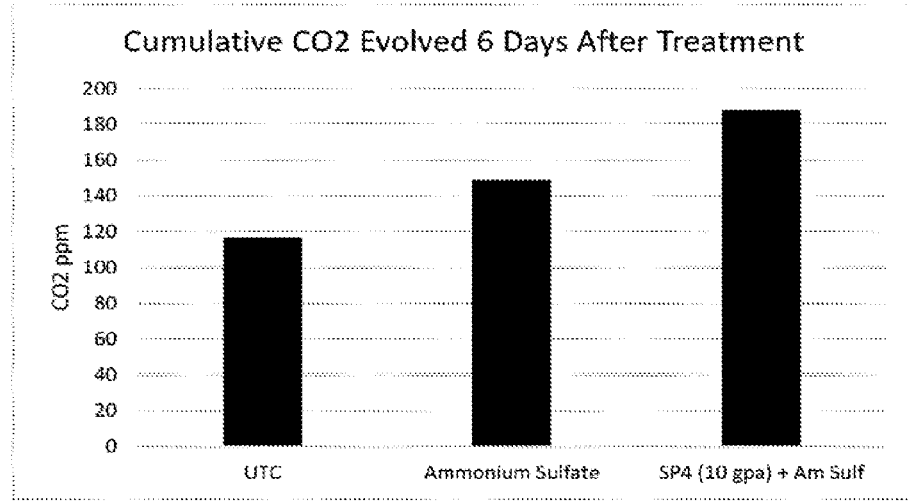

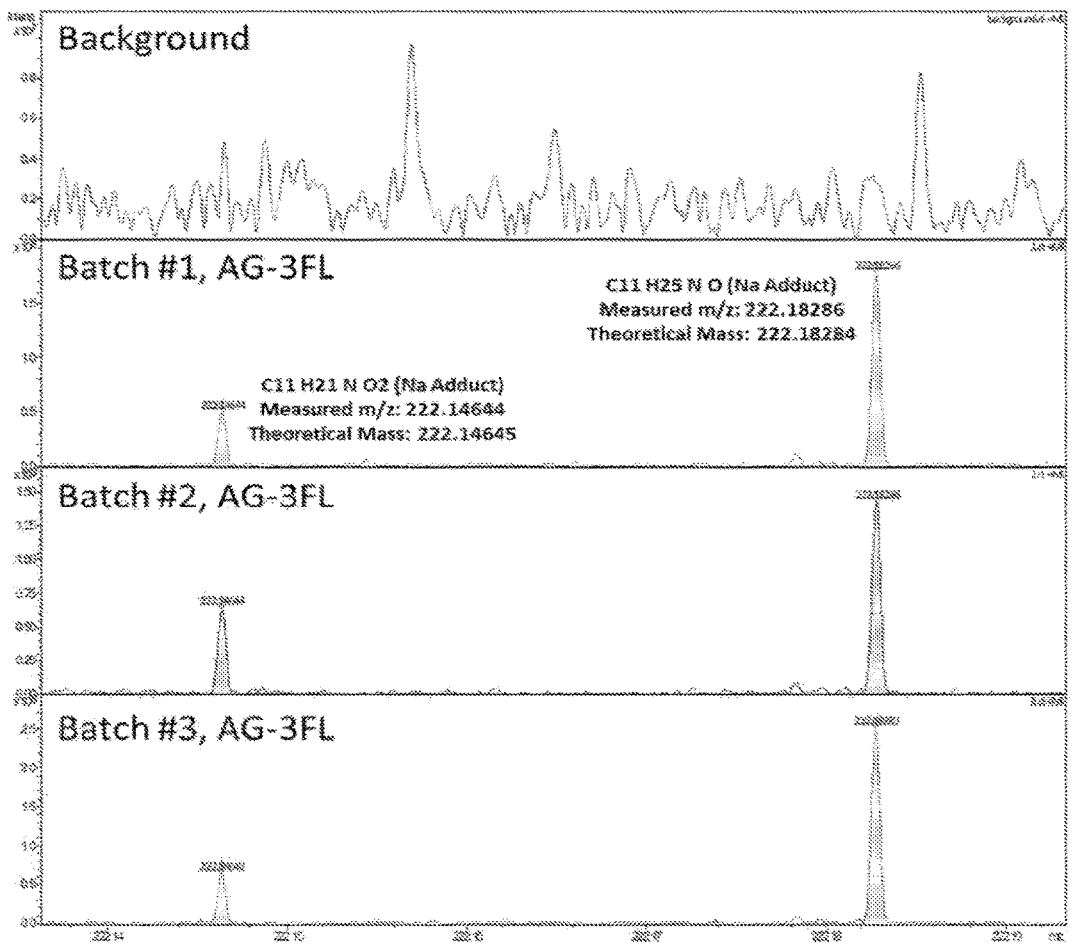

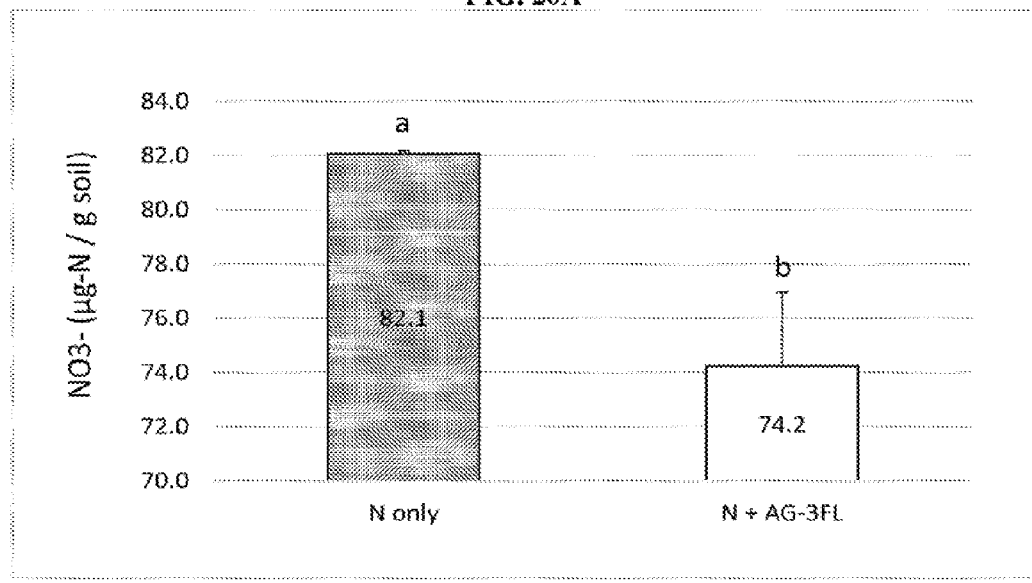
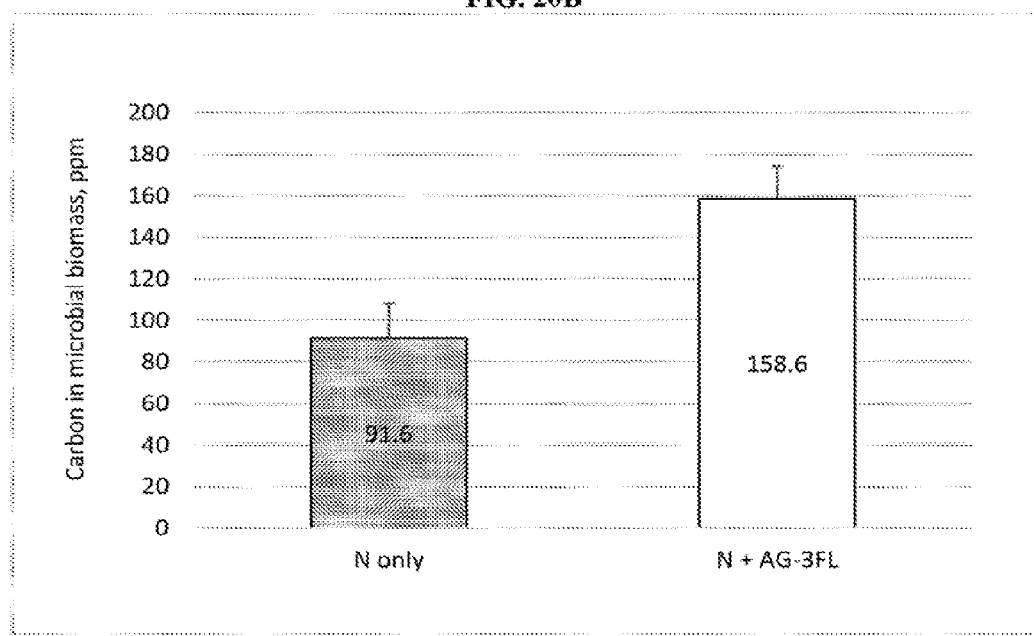

SEMI-HUMIC ORGANIC CARBON MATERIAL AND METHODS OF USE THEREOF

CROSS-REFERENCE TO RELATED APPLICATIONS

This application is a continuation under 35 U.S.C. 365(c) of International Application No. PCT/US2017/016237, filed Feb. 2, 2017, which application claims the benefit under 35 U.S.C. 119(e) to U.S. Provisional Application No. 62/290,879, filed Feb. 3, 2016 and 62/445,686, filed Jan. 12, 2017, where the contents of each is incorporated herein by reference in its entirety.

FIELD

This disclosure relates to a semi-humic material and semi-humic compositions comprising the same, wherein the semi-humic material comprises a fulvic-like component and optionally increased bioactive functional groups, and other organic carbon, and methods of use thereof, and a process for obtaining the same. Also described are methods for maintaining more available nitrogen and phosphorus in the plant root zone and minimizing premature leaching and loss of the nitrogen and/or phosphorus into the atmosphere, surface waters and/or subsurface ground water.

BACKGROUND

Agricultural fertilizers commonly include the plant macronutrients nitrogen and phosphorus. After fertilizer is applied to the soil of an agricultural field, these constituents are often prematurely depleted, which can have detrimental effects on the environment and significantly reduce the pool of available nutrients.

A principle cause of nitrogen loss is surface volatilization. This occurs proximate to the surface of the soil. Urea is a major nitrogen fertilizer. Urea nitrogen reacts with urease enzyme in the soil and breaks down to form ammonia gas. At or near the surface, there is typically little soil water to absorb these gases and, as a result, they escape into the atmosphere. This condition worsens when the urea forms of nitrogen are applied to the field but are not in direct contact with the soil, such as when urea is spread on corn residues or urea ammonium nitrate solution is sprayed on heavy residues of corn stalk or a cover crop. The rate of surface volatilization typically depends on the moisture level, temperature and surface pH of the soil. If the soil surface is moist, water in the soil evaporates into the air. Ammonia released by the urea is captured by the water vapor and lost into the atmosphere. Air temperatures greater than 50° F. and a soil pH greater than 6.5 significantly increase the rate of urea conversion to ammonia gases and resultant surface volatilization.

In certain applications, gaseous ammonia is applied to the soil of an agricultural field by metal application shanks that are introduced into the soil. If the soil is not thoroughly covered and packed behind the shanks, ammonia gas and its constituent nitrogen are lost from the soil surface before being absorbed into the soil water and converted to ammonium, which adsorbs to the soil particles.

Surface volatilization of nitrogen can also occur when ammonium forms of nitrogen (e.g., ammonium sulfate, di-ammonium phosphate, etc.) are applied to the surface of calcareous soils having a pH greater than 7.5. The reaction products formed when such ammonium fertilizers react with calcium carbonate tend to volatilize and dissipate into the atmosphere.

Another cause of nitrogen depletion from agricultural fertilizers is denitrification. This occurs when nitrate ($NO_3^-$) is present in the soil, but not enough oxygen is present to supply the needs of the bacteria and microorganisms in the soil. If oxygen levels are too low, such microorganisms strip the oxygen from the nitrate. This produces nitrogen gas ($N_2$) or nitrous oxide ($N_2O$), which volatilize readily from the soil. Denitrification increases when the soil is wet or compact or when excessively warm temperatures are encountered.

Leaching of nitrate is yet another cause of unwanted nitrogen loss. This occurs when the soil receives more incoming water (by either rain or irrigation) than it can hold against the force of gravity. As water migrates downward though the soil, nitrate-N, which is water soluble, moves with the water and is lost into the groundwater, from where it cannot travel against gravity back up into the soil profile. Although ammonium ($NH_4^+$) forms of nitrogen tend to leach very little in most soils, ammonium leaching can be significant in coarse-textured sands and some muck soils.

Both nitrogen and phosphorus can also be subject to premature depletion through runoff. Such runoff tends to occur when the soil receives more incoming water through rain or irrigation than the soil can accommodate. As water moves over the soil, some of the soil may be loosened and move with the water. The excess water can then carry the dislodged soil and any adsorbed fertilizer nitrogen and phosphorus away from the agricultural site. The offsite movement of such nitrogen and phosphorus due to runoff can be particularly severe in sloped or hilly terrains.

The depletion of nitrogen and phosphorus described above presents a number of problems and disadvantages. Because a significant portion of the plant-enhancing nutrients are lost, many agricultural fertilizer treatments tend to be inefficient and not optimally effective. A considerable amount of the active nitrogen and phosphorus nutrients applied to the field are wasted, plant growth may be slowed and/or an inferior crop may result. Applying additional fertilizers to make up for the nitrogen/phosphorus depletion can add considerable cost, both to the grower and to the consumer, can add to losses, and is not always effective. Another problem associated with depletion of nitrogen and phosphorus from agricultural fertilizers is the adverse environmental effects that frequently result. In particular, leaching of nitrates and urea as well as runoff of nitrogen and phosphorus-bearing sediments can contaminate and pollute nearby surface water (e.g., streams, rivers, lakes, ocean, etc.) and ground water (e.g., aquifers). Nitrate leaching is a significant environmental problem, because above certain levels, nitrate in drinking water is toxic to humans.

In addition, volatile nitrogen oxides, such as nitrous oxide ($N_2O$), are known to be contributors to greenhouse gas (GHG), which can adversely affect the environment. Fertilizer runoff can cause phosphorus pollution of surface waters. When the amount of fertilizer applied to a site is increased to compensate for depletion, this only adds to the volume of potentially polluting crop nutrients introduced into the environment.

SUMMARY

The present disclosure relates to a semi-humic material obtained from leonardite ore, and compositions comprising the same. The semi-humic material disclosed herein has unique chemical properties such as, but not limited to, increased water solubility and optionally increased bioactive functional groups, and other organic carbon, which helps reduce nutrient depletion in agricultural soils via biological and/or chemical pathways.

In one embodiment, provided is a semi-humic material characterized as having a greater than about 55% of molecules classified as Lipid, protein and other aliphatic by FTICR-MS. In some embodiments, the semi-humic material is further characterized as having a greater than about 9% of molecules classified as lignin by FTICR-MS. In some embodiments, the semi-humic material is further characterized by FTICR-MS as having a less than about 16% of molecules classified as Condensed Aromatic.

In one embodiment, provided is a semi-humic material characterized as having a greater than about 55% of molecules exhibiting a H:C of between about 1.5 and about 2.2, and exhibiting a O:C of between 0 and about 0.6 by FTICR-MS.

In certain embodiments, provided is a semi-humic material obtained by a process comprising:

(a) heating an aqueous composition comprising leonardite ore and a non-humic organic carbon source to a temperature of from about 140° F. to about 160° F. to provide a first liquid portion having a fulvic acid fraction and a first solid portion;

(b) separating the first liquid portion from the first solid portion;

(c) adjusting the pH of the first liquid portion to about 8.5 or above; and (d) aging the first liquid portion for at least about 45 days such that the first liquid portion separates into a second liquid portion having a fulvic acid fraction and a second solid portion, wherein the pH of the second liquid portion is not adjusted and has a pH of from about 5 to about 7.

By performing the process as described herein, the fulvic acid fraction of the second liquid portion shows a percentage increase of carbon of at least about 5% by weight compared to the fulvic acid fraction of the first liquid portion. It is contemplated that the % increase in carbon of the second liquid portion is due to the formation of a fulvic-like component, and optionally increased bioactive functional groups. In some embodiments, the percentage increase of carbon is at least about 25% by weight.

As such, provided herein is a semi-humic material, and compositions comprising the same, obtainable by the processes disclosed herein.

The present disclosure relates to methods for controlling the depletion rate of nutrients in soil. In addition, the methods also greatly reduces the adverse environmental impact previously caused by such fertilizers.

Other features and advantages will occur from the following description and the accompanying drawings.

BRIEF DESCRIPTION OF THE DRAWINGS

FIG. 7 shows the percent total nitrogen distribution after 216 hours.

FIG. 8 shows the carbon dioxide evolution for 6 days following treatment.

FIG. 18 shows a ESI positive spectra from an LPOA class methylation series uniquely assigned to AG-3FL.

FIG. 20A shows the effect of AG-3FL on soil nitrate concentration vs. control, 7 days after treatment. Both treatments received 100 lbs N/acre. The percent reduction was 9.6%. Columns labeled by different letters are different by the t-test at p=0.10. Standard errors are shown for each mean (n=4).

FIG. 20B shows the effect of AG-3FL on carbon in soil microbial biomass vs. N-Only control, 14 days after treatment. Both treatments received 100 lbs N/acre. The percent increase was 73%. Columns labeled by different letters are different by the t-test at p=0.10. Standard errors are shown for each mean (n=4).

DETAILED DESCRIPTION

Definitions

Figure 1:
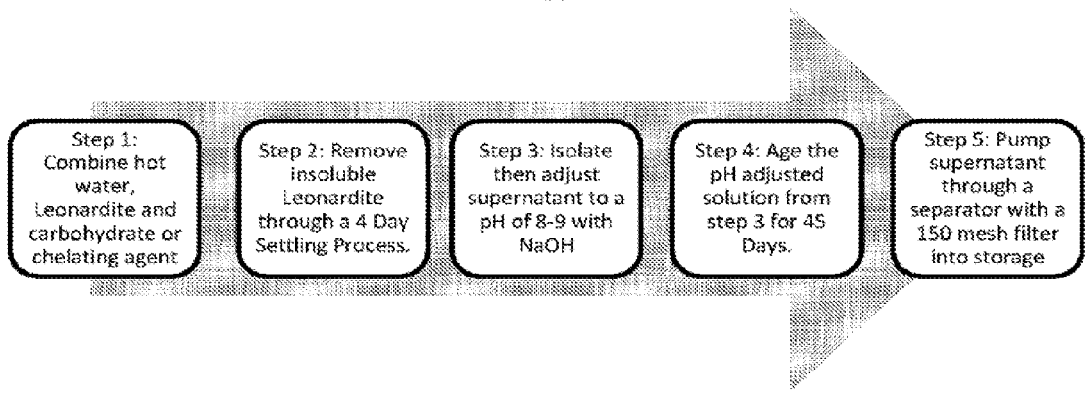
FIG. 1 shows the manufacturing process for a semi-humic composition obtained from leonardite ore (i.e., AG-3FL).

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

| List of Abbreviations | |
|---|---|
| ac | Acre |
| ha | Hectare |
| NDRS | Nutrient Depletion-Restricting Substance |
| wt | Weight |
| Lbs/Lb | Pounds |
| mM | Millimolar |
| Gal/gal | Gallon |
| N | Nitrogen |
| v | Volume |
| IPA | Isopropanol |
| h | hour |
| UAN | Urea ammonium nitrate (UAN 28 contains 28% N by weight) |

It must be noted that as used herein and in the appended claims, the singular forms "a", "an", and "the" include plural referents unless the context clearly dictates otherwise. Thus, for example, reference to "a nutrient" includes a plurality of nutrients.

Unless defined otherwise, all technical and scientific terms used herein have the same meaning as commonly understood by one of ordinary skill in the art to which this disclosure belongs. As used herein the following terms have the following meanings.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) claimed. "Consisting of" shall mean excluding more than trace elements of other ingredients and substantial method steps. Embodiments defined by each of these transition terms are within the scope of this disclosure.

The term "about" when used before a numerical designation, e.g., temperature, time, amount, and concentration, including range, indicates approximations which may vary by (+) or (−) 10%, 5% or 1%.

Humic substances (HS) are defined by the IHSS (International Humic Substances Society) as complex, heterogeneous mixtures of polydispersed materials formed by biochemical and chemical reactions during the decay and transformation of plant and microbial remains (a process called humification). HS are naturally present in soil, water, peats, brown coals and shales. Traditionally these substances have been isolated into three fractions: humic acid, fulvic acid and humin. These fractions are operationally defined based on solubility in basic and acidic solutions. Leonardite, a brown coal, is known to be rich in humic acid.

The term "semi-humic" is intended to refer to a composition which comprises both humic and non-humic organic carbon molecules which have been transformed into new molecules containing carbon from both sources.

The term "fulvic-like component" is intended to refer to the fraction precisely analogous to a fulvic acid extraction from a genuine humic substance as obtained by the CDFA Humic Acid Method, or analogous test. The term "fulvic-like" rather than "fulvic" is used when the test substances are "semi-humic" rather than "humic" in nature.

The term "bioactive functional groups" is intended to refer to compounds having oxygen containing functional groups, for example, carboxylic acids, alcohols (e.g., phenols), ethers, esters, etc. In certain embodiments, the compounds having oxygen containing functional groups are largely aromatic. In certain embodiments, the bioactive functional groups refer to both carboxylic acids and phenols.

The term "fertilizer" is intended to refer to is any material of natural (organic) or synthetic origin (other than liming materials) that is applied to soils or to plant tissues (usually leaves) to supply one or more plant nutrients essential to the growth of plants. In an "organic" type fertilizer, the base is decomposed or processed plant and/or animal by-products (e.g., manure or fish emulsion). In certain embodiments, the fertilizer comprises one or more of a urea component, an ammonium component, a nitrate component, an ammonia component, an organic nitrogen component, and/or a phosphorus component. The fertilizer can comprise liquid and/or solid components and may contain one or more micronutrients, such as iron, manganese, molybdenum, zinc, and/or copper. In certain embodiments, the fertilizer is not a calcium based fertilizer (e.g., CAN 17). In certain embodiments, the fertilizer has a pH of greater than about 4.

The term "nutrient" is intended to refer to one or more macronutrient, such as nitrogen (N), phosphorus (P), or potassium (K); and/or micronutrients such as calcium (Ca), magnesium (Mg), (S), zinc (Zn), etc.

The term "applying" or "applied" to the soil is intended to refer to any suitable method for applying a fertilizer and/or a NDRS to soil. The term is intended to encompass methods for applying liquid, solid, or other form or mixture thereof to the soil. In certain embodiments, the "applying" or "applied" to the soil comprises one or more of spraying, flooding, soil injection and/or chemigation. In certain embodiments, direct application of solutions may be made into drip or micro-sprinkler irrigation systems. In certain embodiments, the solutions may be applied through center pivot irrigation systems. In certain embodiments, the "applying" comprises direct injection in the root zone area.

The term "depletion rate" is intended to refer to the rate at which a fertilizer (or one or more nutrients) are depleted from the soil. In certain embodiments, the fertilizer is depleted at a rate of or less than about 50%, or less than about 40%, or less than about 30%, or about 20%, or less than about 10% as compared to fertilizer alone. In certain embodiments, the amount of nutrient (e.g., nitrogen) used to fertilize a crop may be reduced by at least about 25%, or at least about 40-50%. In certain instances, the nitrogen depleted from the soil is recovered in the biomass of the resultant crop grown therein. In certain embodiments, at least about 50 Lbs/acre of nitrogen may be recovered in the biomass of the resultant crop. The crop can be any crop, such as, but not limited to, vegetable crops, row crops, deciduous fruit and nut trees, grapes, olives, citrus, turf, pasture and ornamentals.

The term "reducing water and/or air pollution" is intended to refer to the reduction in one or more of nutrient loss by volatilization, leaching, and/or surface runoff. In certain embodiments, the water and/or air pollution is reduced by at least about 50%, or at least about 40%, or at least about 30%, or at least about 20%, or at least about 10% as compared to fertilizer alone.

The term "nutrient availability" is intended to refer to the proportion of the total nutrient amount in soil can be taken up and utilized by plants. This fraction is called the available fraction, and depends on the chemical nature of the nutrient in question, as well as soil type and other influences from within the soil environment (see, e.g., Marscher, P. Mineral Nutrition of Higher Plants (Third Edition), 2012, Elsevier, Amsterdam).

A Semi-Humic Material Having an Increased Fulvic-Acid-Like Component and Increased Bioactive Functional Groups Disclosed herein is a semi-humic material, and compositions comprising the same. The semi-humic material described herein is obtained from leonardite ore, although other organic carbon may be used. The semi-humic material has an increased fulvic acid-like component and optionally increased bioactive functional groups. In one embodiment, the increased bioactive functional groups are oxygen-containing functional groups, such as carboxylic acids and phenols.

In one embodiment, provided is a semi-humic material characterized as having a greater than about 55% of molecules classified as lipid, protein and other aliphatic by FTICR-MS. The lipid, protein and other aliphatic region of a Van Krevelen diagram is typically defined as those molecules exhibiting a H:C of between about 1.5 and about 2.2, and exhibiting a O:C of between 0 and about 0.67 by FTICR-MS. Accordingly, also provided herein is a semi-humic material characterized as having a greater than about 55% of molecules exhibiting a H:C of between about 1.5 and about 2.2, and exhibiting a O:C of between 0 and about 0.67 by FTICR-MS. In certain embodiments, provided is a semi-humic material characterized as having a greater than about 56%, or greater than about 57%, or greater than about 58%, or greater than about 59%, or greater than about 60%, or about 59% of molecules classified as Lipid, protein and other aliphatic by FTICR-MS.

In some embodiments, the semi-humic material is characterized as having a greater than about 9% of molecules classified as lignin by FTICR-MS. The lignin region of a Van Krevelen diagram is typically defined as those molecules exhibiting a H:C of between about 0.7 and about 1.5, and exhibiting a O:C of between 0.1 and about 0.67 by FTICR-MS. Accordingly, also provided herein is a semi-humic material characterized as having a greater than about 9% of molecules exhibiting a H:C of between about 0.7 and about 1.5, and exhibiting a O:C of between 0.1 and about 0.67 by FTICR-MS. In certain embodiments, provided is a semi-humic material characterized as having a greater than about 10%, or about 10.5% of molecules classified as lignin by FTICR-MS.

In some embodiments, the semi-humic material is characterized as having a less than about 16% of molecules classified as condensed aromatic by FTICR-MS. The condensed aromatic region of a Van Krevelen diagram is typically defined as those molecules exhibiting a H:C of between about 0.2 and about 0.7, and exhibiting a O:C of between 0 and about 0.67 by FTICR-MS. Accordingly, also provided herein is a semi-humic material characterized as having a less than about 16% of molecules exhibiting a H:C of between about 0.2 and about 0.7, and exhibiting a O:C of between 0 and about 0.67 by FTICR-MS. In certain embodiments, provided is a semi-humic material characterized as having a less than about 17%, or less than about 16%, or less than about 15%, or less than about 14%, or less than about 13%, or about 12% or about 13% of molecules classified as Condensed Aromatic by FTICR-MS.

In some embodiments, the semi-humic material is characterized as having about 4-5% of molecules classified as carbohydrate by FTICR-MS. The carbohydrate region of a Van Krevelen diagram is typically defined as those molecules exhibiting a H:C of between about 1.5 and about 2.4, and exhibiting a O:C of between 0.67 and about 1.2 by FTICR-MS. Accordingly, also provided herein is a semi-humic material characterized as having between about 4-5% of molecules exhibiting a H:C of between about 1.5 and about 2.4, and exhibiting a O:C of between 0.67 and about 1.2 by FTICR-MS. In certain embodiments, provided is a semi-humic material characterized as having greater than 1%, or greater than about 2%, or greater than about 3%, or greater than about 4%, or greater than about 5%, or about 4% or about 5%, or from about 4 to about 5% of molecules classified as carbohydrate by FTICR-MS.

The semi-humic material described herein comprises a carbohydrate additive which is added during the manufacturing process (see the examples below). Accordingly, the semi-humic material contains a higher percentage of molecules classified as carbohydrate by FTICR-MS as compared to humic acid (see FIG. 19B and Example 2). However, surprisingly, the number of molecular formulas of the compounds falling within this region increases with the aging step, resulting in a different molecular composition as compared to the pre-aged material. In certain embodiments, number of molecular formulas of the compounds falling within the carbohydrate region is greater than 20, or greater than 25, or about 29 or about 30.

In some embodiments, the semi-humic material is characterized as having about 3% of molecules classified as unsaturated hydrocarbon by FTICR-MS. The unsaturated hydrocarbon region of a Van Krevelen diagram is typically defined as those molecules exhibiting a H:C of between about 0.7 and about 1.5, and exhibiting a O:C of between 0 and about 0.1 by FTICR-MS. Accordingly, also provided herein is a semi-humic material characterized as having between about 4-5% of molecules exhibiting a H:C of between about 0.7 and about 1.5, and exhibiting a O:C of between 0 and about 0.1 by FTICR-MS. In certain embodiments, provided is a semi-humic material characterized as having less than about 5%, or less than about 4% or between about 2 to about 3%, or about 2% or about 3% of molecules classified as unsaturated hydrocarbon by FTICR-MS.

In one embodiment, provided is a semi-humic material characterized as having about 58-59% of molecules classified as lipid, protein and other aliphatic and about 4-5% of molecules classified as carbohydrate by FTICR-MS. In one embodiment, provided is a semi-humic material characterized as having about 58-59% of molecules classified as lipid, protein and other aliphatic, about 10-11% of molecules classified as lignin, about 11-12% of compounds classified as condensed aromatic, and about 4-5% of molecules classified as carbohydrate by FTICR-MS. In one embodiment, provided is a semi-humic material characterized as having about 58-59% of molecules classified as lipid, protein and other aliphatic, about 10-11% of molecules classified as lignin, about 11-12% of compounds classified as condensed aromatic, about 4-5% of molecules classified as carbohydrate, and about 2-3% of molecules classified as unsaturated hydrocarbon by FTICR-MS.

In certain embodiments, provided is a semi-humic material obtained by a process which comprises:

(a) heating an aqueous composition comprising leonardite ore and a non-humic organic carbon source to a temperature of from about 140° F. to about 160° F. to provide a first liquid portion having a fulvic acid fraction and a first solid portion;

(b) separating the first liquid portion from the first solid portion;

(c) adjusting the pH of the first liquid portion to about 8.5 or above; and (d) aging the first liquid portion for at least about 45 days such that the first liquid portion separates into a second liquid portion having a fulvic acid fraction and a second solid portion, wherein the pH of the second liquid portion is not adjusted and has a pH of from about 5 to about 7;

and further wherein the fulvic-like component of the second liquid portion shows a percentage increase of carbon of at least about 5% by weight compared to the fulvic acid fraction of the first liquid portion. In some embodiments, the second liquid portion is at least about 10%, or at least about 15%, at least about 20%, at least about 25%, at least about 30%, by weight greater on a carbon basis than the fulvic acid fraction of the first liquid portion by weight greater than the fulvic acid fraction of the first liquid portion. In certain embodiments, the process further comprises separating the second solid portion from the second liquid portion.

By performing the process described herein, the weight of the fulvic acid fraction is increased as determined by the CDFA Humic Acid Method (see, e.g., Example 1). In certain embodiments, in addition to the weight of the fulvic acid fraction, the % carbon of the fulvic acid fraction is increased (see, e.g., FIGS. 3 and 4). In certain embodiments, the % carbon of the fulvic acid fraction is increased by at least about 5%, at least about 10%, at least about 20% or at least about 30% by performing the process described herein. The increase in carbon content of the fulvic-like component is contemplated to be at least in part due to the conversion of the humin fraction and/or the recombination of humic- and non-humic carbon (see, e.g., FIGS. 3 and 5). It is further contemplated that this conversion is due, at least in part, to presence of microbes during the aging step. Accordingly, other compositions containing humin, and/or other humin-derived components, do not form the semi-humic material described herein simply by aging (e.g., on a shelf).

The fulvic-like component is derived from the semi-humic component in the leonardite ore and from other added organic carbon. In addition, it is contemplated that compounds which contribute to the increased fulvic-like component have an increase in bioactive functional groups. It is contemplated that the beneficial effects of the semi-humic material disclosed herein and compositions comprising the same are attributed to the increased fulvic-like component and, optionally in some embodiments, the increased bioactive functional groups. In one embodiment, the increased bioactive functional groups are oxygen-containing functional groups, such as carboxylic acids and phenols. In certain embodiments, the percent of carboxylic acids and phenols in the semi-humic material is typically about 6-7% or about 6.5% by weight. The percent of carboxylic acids and phenols in the semi-humic material is quantified as a molar concentration then converted to percent by weight using the molecular weight of formic acid and phenol and the density of the material.

In one embodiment, the pH of the first liquid portion in step (c) is adjusted to about 8.5 or above. The pH adjustment can be accomplished using any suitable base, such as but not limited to sodium or potassium hydroxide. In certain embodiments, the pH of the first liquid portion in step (c) is adjusted to about 8.5, or about 9, or about 9.5, or about 10, or about 10.5, or about 11.

In one embodiment, the pH of the aqueous composition of step (a) is from about 5 to about 8, or from about 5 to about 7, or from about 5 to about 6.

In certain embodiments, the non-humic organic carbon source comprises one or more organic acid salts. It is contemplated that the organic acid salt can be the salt of any organic acid. For example, in certain embodiments, the organic acid salt is selected from the group consisting of a sodium, potassium, ammonium, copper, iron, magnesium, manganese, zinc, calcium, lithium, rubidium or cesium salt of ethylene diamine tetraacetic acid, hydroxyethylene diamine triacetic acid, diethylene triamine pentaacetic acid, nitrillo triacetic acid, ethanol diglycine, citric acid, galactaric acid, gluconic acid, glucoheptoic acid, glucaric acid, glutaric acid, glutamic acid, tartaric acid or tartronic acid.

By performing the process disclosed herein, a decrease in pH is observed in the absence of a pH adjustment. In certain embodiments, the pH of second liquid portion ranges from about 5 to about 9, or from about 5 to about 6.

In certain embodiments, the process further comprises separating the second solid portion from the second liquid portion. Accordingly, provided is a semi-humic material which comprises an increased fulvic-like component and increased bioactive functional groups.

Also provided herein is an aqueous composition comprising the semi-humic material obtained by the processes disclosed herein and at least one additional humic substance. In certain embodiments, the aqueous composition comprises from about 1% to about 95%, or about 90%, or about 80%, or about 70%, or about 60%, or about 50%, or about 40%, or about 30%, or about 20%, or about 10%, or about 5%, or from 1% to about 90%, from about 1% to about 80%, from about 1% to about 70%, from about 1% to about 60%, from about 1% to about 50%, from about 1% to about 40%, from about 1% to about 30%, from about 1% to about 20%, from about 1% to about 10%, by weight of the semi-humic composition obtained by the processes disclosed herein. In certain embodiments, the additional humic substance is a nutrient depletion-restricting substance (NDRS), and may be present in an amount ranging from about 30% to about 99% by weight, or from about 90% to about 99% by weight. In one embodiment, the percent of carboxylic acids and phenols in the aqueous composition comprising the semi-humic material is about 9-10%. The percent of carboxylic acids and phenols in the aqueous composition is quantified as a Molar concentration then converted to percent by weight using the molecular weight of formic acid and phenol and the density of the composition. The nutrient depletion-restricting substance (NDRS) includes a liquid formulation containing at least one or both of the following components:

(1) a plant growth stimulating composition produced as described in Marihart, U.S. Pat. Nos. 4,698,090 and/or 4,786,307 (the disclosures of which are incorporated herein by reference in their entirety);

(2) a humic extract from a genuine humic source, e.g., leonardite.

In some embodiments, the NDRS comprises a combination of a plant material extracted from at least one of the group consisting of seaweed, algae and derivatives thereof; and Component 1, each at one to three parts by weight. In another embodiment, the NDRS comprises a combination of Component 1 and Component 2, at one part each by weight. In another embodiment, the NDRS comprises a combination of the plant material at one to three parts by weight, Component 1 at one to three parts by weight and Component 2 at one to three parts by weight. The humic extract (Component 2 above) can comprise any humic substance, including Component 1. For example, it can comprise one or more of a plant growth stimulating composition produced as described in Marihart (see, U.S. Pat. Nos. 4,698,090 and 4,786,307, the disclosures of which are incorporated herein by reference), or a humic substance (HS) comprising humic acid, fulvic acid and humin.

In certain embodiments, the NDRS may optionally comprise one or more chelating agents (e.g., carbohydrates). The chelating agent can be any one or more of sodium, potassium, ammonium, copper, iron, magnesium, manganese, zinc, calcium, lithium, rubidium or cesium salt of ethylene diamine tetraacetic acid, hydroxyethylene diamine triacetic acid, diethylene triamine pentaacetic acid, nitrillo triacetic acid, or ethanol diglycine. In one embodiment, the chelating agent is a carbohydrate or a carboxylic acid, such as one selected from the group consisting of an ammonium or metal salt of a variety of organic acids. Non-limiting examples of organic acids, include citric acid, galactaric acid, gluconic acid, glucoheptoic acid, glucaric acid, glutaric acid, glutamic acid, tartaric acid, and tartronic acid.

A representative NDRS to be used in the methods provided herein can be prepared according to U.S. Pat. No. 4,698,090. For example, one exemplary NDRS can be prepared by adding 9 parts (by weight) of leonardite ore to 75 parts of water, previously heated to a temperature of 170° F.-195° F. but to no greater than 225° F. A carbohydrate or a carboxylic acid, such as one selected from the group consisting of an ammonium or metal salt of various organic acids (as described above), such as potassium tartrate (15 parts by weight), is added and the liquid composition is mixed for five hours and then allowed to settle in multiple stages. Depending upon the desired planting environment, the extracted liquid may be used in its resulting acidic condition. Alternatively, the pH may be adjusted by adding sodium hydroxide or potassium hydroxide.

In one embodiment, an exemplary nutrient depletion-restricting substance (NDRS) comprises disaggregated humin (e.g., from about 2% to about 5%) in a colloidal suspension, as well as humic acid, fulvic acid, and optionally certain plant growth modification compositions and/or additional plant material extracts.

In certain embodiments, the aqueous composition may also comprise another source of nutrient (e.g., micro or macro), such as a plant material extracted from at least one of the group consisting of seaweed, algae and derivatives thereof. In one embodiment, the aqueous composition also comprises seaweed.

In any one embodiment, any composition as described herein can further comprise a fertilizer. The fertilizer may comprise any nitrogen and/or phosphorus containing fertilizer used for agricultural or other plant growth enhancing purposes. The fertilizer as used herein can comprise one or more of a urea component, an ammonium component, a nitrate component, an ammonia component, an organic nitrogen component, and/or a phosphorus component. In certain embodiments, the fertilizer is not a calcium based fertilizer (e.g., CAN 17). In certain embodiments, the fertilizer has a pH of greater than about 4.

In certain embodiments, the fertilizer and a semi-humic material or aqueous composition as described herein are pre-mixed in solution prior to the addition to the soil, such as at a blending plant. Their respective concentrations may range from 1% to about 20%, or from 1% to about 15%, or from 1% to about 10% by weight of any of the compositions described herein to fertilizer. In certain embodiments, the weight/weight ratio of any of the compositions described herein to fertilizer is about 1:100 to about 2:1. Exemplary ratios further include about 1:90, about 1:75; about 1:60; about 1:50; about 1:25; about 1:10; and about 1:1.

Accordingly, provided herein is a nitrogen-containing composition comprising a nitrogen-based fertilizer and the semi-humic material, or an aqueous composition comprising the same, as described herein. Suitable nitrogen-based fertilizers include urea ammonium nitrate (UAN), ammonium nitrate (AN) or aqua ammonia solutions. In certain embodiments, the semi-humic material is present in the nitrogen-containing composition as an aqueous composition with a humic substance (e.g., a NDRS). In certain embodiments, the aqueous composition comprising the semi-humic material described herein is present in an amount of at least about 2 gallons, or about 2, or about 3, or about 4, or about 5, or about 6, or about 7, or about 8, or about 9, or about 10 gallons per 100 pounds of fertilizer nitrogen.

In certain embodiments, the semi-humic material or aqueous composition as described herein is pre-mixed with a pesticide and a fertilizer prior to the addition to the soil.

Methods

In one aspect, the present disclosure involves treating the soil of an agricultural, turf or sod grass field or other planting site with the semi-humic material, a semi-humic composition obtained by the processes described herein, or an aqueous composition comprising the same. In certain embodiments, the treating comprises use of a nitrogen and/or phosphorus based fertilizer. In certain embodiments, the treating comprises use of a pesticide. In certain embodiments, the semi-humic material or aqueous composition as described herein works to retain nitrogen while maintaining bioavailability of the nitrogen for the crop.

The soil to be treated can be any soil type, including, but not limited to, clay, loam, clay-loam, silt-loam, and the like. In some embodiments the soil comprises about 30-70% sand, about 20-60% silt, about 10-25% clay and about 0.5 to 3% organic matter. In some embodiments, the soil comprises about 20-40% sand, about 30-50% silt, about 20-40% clay and about 0.5 to 5% organic matter. In some embodiments, the soil comprises about 30-35% sand, about 40-45% silt, about 25-30% clay and about 1-5% organic matter. In some embodiments, the soil comprises about 15-20% sand, about 35-40% silt, about 35-40% clay and about 1-5% organic matter. In some embodiments, the soil comprises about 30-35% sand, about 45-50% silt, about 20-25% clay and about 1-5% organic matter. In some embodiments, the soil comprises about 35-40% sand, about 40-45% silt, about 15-20% clay and about 1-5% organic matter. In some embodiments, the soil comprises about 65-70% sand, about 20-25% silt, about 10-15% clay and about 0.5-1% organic matter. In some embodiments, the soil comprises about 25-30% sand, about 40-45% silt, about 30-35% clay and about 0.5-1% organic matter. In some embodiments, the soil comprises about 5-10% sand, about 30-35% silt, about 60-65% clay and about 1-5% organic matter. In some embodiments, the soil comprises about 40% sand, about 45% silt, about 17% clay and about 3% organic matter, or about 40% sand, about 45% silt, about 17% clay and about 3% organic matter, or about 30% sand, about 40% silt, about 29% clay and about 1% organic matter, or about 65% sand, about 20% silt, about 14% clay and about 1% organic matter, or about 33% sand, about 42% silt, about 25% clay and about 3% organic matter, or about 20% sand, about 40% silt, about 40% clay and about 4% organic matter, or about 30% sand, about 50% silt, about 20% clay and about 2% organic matter, or about 40% sand, about 45% silt, about 15% clay and about 3% organic matter, or about 65% sand, about 20% silt, about 15% clay and about 0.5% organic matter, or about 10% sand, about 30% silt, about 60% clay and about 2% organic matter. In certain embodiments, the soil is not severely hydrated or water logged.

Conventional application techniques such as spraying, fertigation or shank injection may be employed. In certain embodiments, soil has been fertilized (i.e., fertilizer may have been pre-applied to the soil). In certain embodiments, direct application of the semi-humic material, or an aqueous composition comprising the same, may be made into drip or micro-sprinkler irrigation systems. In certain embodiments, the semi-humic material, or an aqueous composition comprising the same, may be applied through center pivot irrigation systems. In certain embodiments, the semi-humic material, or an aqueous composition comprising the same, is applied via direct injection in the root zone area. In certain embodiments, the semi-humic material, or an aqueous composition comprising the same, is applied via surface shank or side dress.

In certain embodiments, application is performed early in the life cycle of the crop. The semi-humic material, or an aqueous composition comprising the same, may be applied may be applied pre-plant, as a starter, side dressed, fertigated, top dressed or banded to the soil, and may be diluted with water to ensure uniform distribution. In certain embodiments, the application is repeated one or more times. In certain embodiments, the application is performed to the soil. In certain embodiments, the application is performed via fertigation. Exemplary crops include, but are not limited to, vegetables and fruit crops, field and row crops, and orchards and vineyards.

The amount of the semi-humic material or aqueous composition comprising the same to be applied may be calculated in a variety of ways. For example, the amount of the semi-humic material may be expressed in a variety of units, including mass or volume of material per mass or volume of soil, area of land, or mass of fertilizer. In one embodiment, the rate may be the mass of the aqueous composition (e.g., an aqueous composition comprising the semi-humic material and a NRDS) per mass of fertilizer or mass of nitrogen or phosphorus in the fertilizer. Various ratios for the components in the aqueous composition are described above. Suitable rates include:

| | Units | |
|---|---|---|
| | Liters aqueous composition per ha | Liter aqueous composition per 100 kg N or P |
| Low end of range | 5 | 2 |
| | 20, 30, 50, 80, 2000, or 5,000 | 3, 8, 10, 12, 30, 60, 100 or 500 |
| High end of range | 15,000 | 1000 |

In one embodiment, the aqueous composition is applied in a range of from about 20 to about 50 Liters per hectare of soil. In one embodiment, the aqueous composition is applied in a range of from about 2 to about 12 Liters per 100 kilograms of nitrogen or phosphorus in the fertilizer.

The semi-humic material, or an aqueous composition comprising the same, as described herein is particularly preferable to known substances for restricting nutrient depletion because it affects the standard nitrogen cycle at multiple points, whereas each prior product is designed to act at a single point. The present method thereby eliminates the need to use multiple overlapping products, which are unduly expensive and tend to compound the adverse environmental effects commonly exhibited by each of those products.

Provided herein is a method for limiting the risk of nutrient contamination of the environment that has previously accompanied the use of agricultural fertilizers.

The methods described herein significantly control and reduce the depletion of the plant nutrients, such as nitrogen and phosphorus, present in the soil, by about 10% to greater than about 50% and make this portion of those nutrients available for plant usage as the crop matures as compared to the use of a fertilizer alone. In certain embodiments, the present disclosure relates to a method for controlling the depletion rate of a nutrient in soil. The depletion rate can be a measure of nitrogen loss by any method, for example, volatilization and/or leaching.

In one embodiment, the method comprises applying a semi-humic material or an aqueous composition comprising the same and a fertilizer to soil or applying a semi-humic material or an aqueous composition comprising the same to soil which has been fertilized, wherein the depletion of the nutrient was reduced by about 20 to about 80% by weight at about 7 days after applying the semi-humic material or an aqueous composition comprising the same and/or fertilizer to the soil.

In other embodiments, the depletion of the nutrient was reduced by about 20%, or about 25%, or about 30%, or about 35%, or about 40%, or about 45%, or about 50%, or about 55%, or about 60% or about 65%, or about 70%, or about 75%, or about 80% by weight at about 7 days after applying the semi-humic material or an aqueous composition comprising the same and a fertilizer to the soil. In certain embodiments, the temperature is from about 22 to about 35° C.

In certain embodiments, the fertilizer is nitrogen based and comprises ammonia, ammonium, nitrate and/or urea. In certain embodiments, the semi-humic material or an aqueous composition comprising the same is applied to the soil at a concentration of less than about 0.1 milligram of semi-humic composition per 100 grams of soil, or less than about 0.5 milliliter of semi-humic composition per 100 grams of soil, or less than about 0.1 milliliter of semi-humic or an aqueous composition comprising the same per 100 grams of soil.

Figure 12:
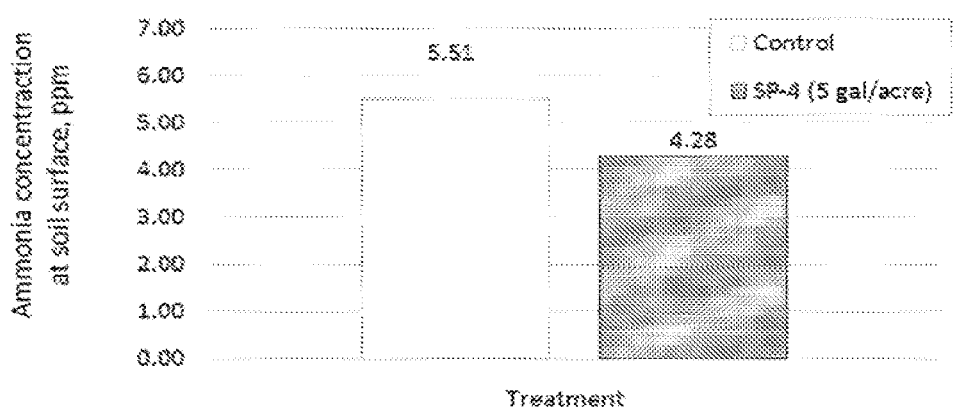
FIG. 12 shows the $NH_3$ volatilization reduction associated with a composition comprising the semi-humic material (i.e., SP-4) treatment at the Ohio field location.

In particular, as shown in FIG. 12, the combination of fertilizer and semi-humic material or an aqueous composition comprising the same in accordance with the present methods, significantly reduces ammonia ($NH_3$) volatilization following application of the fertilizer to the agricultural field. The semi-humic material was found to have a significant mitigating influence on the rate ammonia is released to the atmosphere. As such, provided are methods for reducing water and/or air pollution caused by the use of a fertilizer in soil.

As depicted in FIG. 12, treatment of the soil as described herein caused a significant reduction in the amount of ammonia released to the atmosphere. It is contemplated that this occurs because the semi-humic material, or an aqueous composition comprising the same, provides for an increased adsorption surface for the ammonia and/or interacts with soil biota. This reduces gas loss from the soil surface. It also delays nitrification of the urea from the fertilizer so that conversion to leachable nitrate occurs much closer to the time when the crop will require the nutrient. Rather than leaching through the soil and being wasted, the nitrogen is immobilized and stabilized until the plant grows sufficiently to require it as a nutrient. In one embodiment, provided is a method of reducing nitrate leaching into soil by at least 10% after about 9 days, comprising applying the semi-humic material or an aqueous composition comprising the same and a fertilizer to the soil.

In one embodiment, provided is a method for increasing nitrogen uptake within a crop, comprising applying a semi-humic material or an aqueous composition comprising the same having a low molecular weight humin component, and optionally a fertilizer, to soil or applying a semi-humic material or an aqueous composition comprising the same to soil which has been fertilized. In certain embodiments, the weight of nitrogen contained in the biomass of the crop is increased by least about 15%, or about 50%, or about 45%, or about 40%, or about 35%, or about 30%, or about 25%, or about 20%, or about 15%, or about 10%, or about 5% by weight versus the weight of nitrogen contained in the biomass of a crop where a semi-humic material was not applied to the soil. In certain embodiments, the nitrogen biomass in a crop is increased while maintaining or enhancing crop quality and yield.

It is contemplated that the combined application of fertilizer and semi-humic material delays reaction of the nitrogen within the fertilizer with the urease enzymes in the soil. This in turn slows the conversion of urea by urease thereby reducing nitrogen losses due to urea volatilization. Instead, the nitrogen remains as urea able to be moved into the soil with rainfall or irrigation. When urea converts into ammonium in the root zone, nitrogen is adsorbed by the soil particles, stabilized and utilized effectively, as needed, by the growing plants. Subsurface nitrogen adsorption also minimizes accumulation of nitrates and ammonium in the surface soil, which can otherwise lead to denitrification and resultant volatilization of nitrogen gas or nitrous oxide from the soil or runoff with rainfall.

In another aspect, provided herein is a method for enhancing microbial activity as measured by the amount of $CO_2$ evolved from aerobic microbial respiration, or measured directly. The increased release of $CO_2$ indicates that as the microbial population increases, nitrogen is immobilized or stored in the microbial biomass to later provide nutrients to the developing crop (FIG. 8). In effect, the increased production of carbon dioxide indicates that the microbial biomass is increasing and therefore requiring a greater amount of nitrogen than the control. The microbes' production of this carbon dioxide indicates that nitrogen is being effectively immobilized (stored within microbial biomass) and stabilized in the root zone and not lost to leaching. Immobilization is known to be a beneficial to soil nitrogen cycling and crop growth, because as the microbes follow their life cycles, the nitrogen is subsequently released back into plant-available mineral form.

Use of fertilizer and a humic composition as described herein therefore effectively immobilizes nitrogen from nitrogen based granular and liquid fertilizers, crop residues, manures and manure slurries/wash water. This slows nitrification and denitrification and delays urease activity, which, in turn, minimizes rapid and/or large accumulation of nitrates in the soil. As the soil nitrate-N appears more slowly, this allows for crop demand to synchronize and increase proportionally with the increase of nitrogen availability. Microbial activity immobilizes nitrogen and with subsequent mineralization enables the fertilizer to work far more effectively and efficiently than in the past. Accordingly, in certain embodiments, the microbial activity is increased by at least about 20% after about 6 days in a soil having been treated with the semi-humic material versus the microbial activity in a soil in the absence of added semi-humic material having a low molecular weight humin component. The semi-humic material may applied to the soil at a concentration of at least about 0.1 mg of semi-humic material per about 100 grams of soil, or between about 0.1 and 1 mg of semi-humic material per about 100 grams of soil.

Although the present methods may be used with any type of soil, in certain embodiments, the soil comprises about 65% sand, and may further comprise about 20% silt, about 14% clay and about 1% organic matter. In certain embodiments, the microbial activity is measured by evolution of carbon dioxide from the soil. Thus, in some embodiments, carbon dioxide evolution is increased by at least about 2 fold after about 45 days, and the soil comprises about 30% sand, and may further comprise about 40% silt, about 29% clay and about 1% organic matter.

In practice, organic residues may be added to the field following harvest. Decomposition of such residues and nitrogen release therefrom (mineralization) is seldom synchronized with crop growth. Use of the present method to treat such residues and such soils helps to promote nitrogen mineralization so that the nitrogen in the residue also becomes available as a plant nutrient at a time that beneficially coincides with the crop's need for nitrogen for optimum growth. This facilitates N uptake before the nitrates overly accumulate in the soil and are more prone to leaching. Periodically adding the formulations of this disclosure to organic residues reduces depletion considerably compared to standard practices.

Provided herein is a method of increasing nitrate immobilization in soil by at least about 20% after about 9 days, comprising applying a semi-humic material, or a composition comprising the same, to soil. In certain embodiments, the semi-humic composition is applied to the soil at a concentration of at least about 0.1 mg of semi-humic material per 100 grams of soil, or between about 0.1 mg and 1 gram of semi-humic material per about 100 grams of soil. In certain embodiments, the nitrate immobilization is increased by at least about 50%, or at least about 45%, or at least about 40%, or at least about 35%, or at least about 30%, or at least about 25%, or at least about 20% after about 9 days.

In certain embodiments, the immobilizing comprises inhibiting and/or mitigating transformation of nitrate ($NO_3^-$) and/or ammonium ($NH_4^+$) to nitrogen or ammonia gas. In certain embodiments, the ratio of $NH_4^+/(NH_4^++NO_3^-)$ is greater than at least about 0.02.

As a further benefit, the semi-humic material to be used in the methods described herein are generally safer (e.g., to humans and the environment) and offer handling advantages over many other products which reduce nitrogen loss, some of which are labeled and licensed to be used as pesticides. In contrast, most existing chemicals used to prevent nutrient depletion pose risks to human health and the environment, depending on the exposure level.

Figure 10:
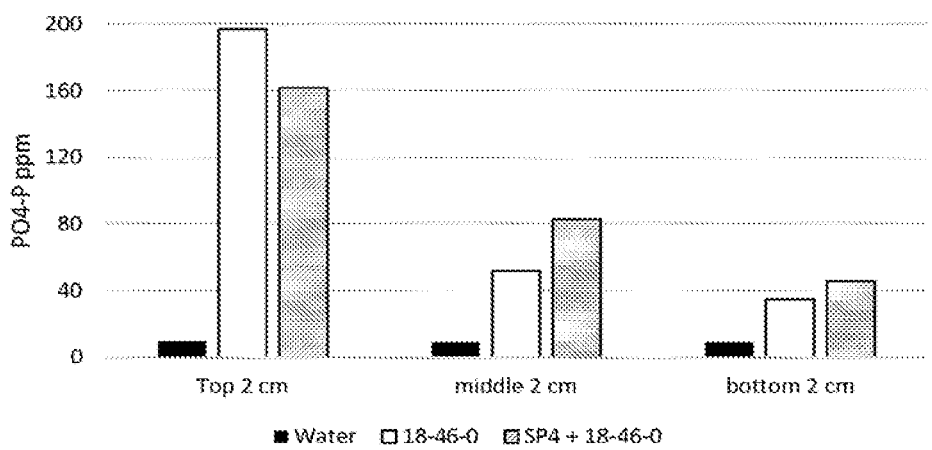
FIG. 10 shows the effect of a composition comprising the semi-humic material (i.e., SP-4) on phosphorus (e.g., phosphate) in surface soil.

Still further, the methods described herein reduce environmental hazards due to runoff. For example, phosphorus is lost in soil during erosion caused by rain. As shown in FIG. 10, by applying a semi-humic material as described herein, it is contemplated that phosphorus runoff will be reduced.

Certain methods described herein are performed by applying a fertilizer and a semi-humic material concurrently or separately, at or about the same time (e.g., within about 3, or about 2, or about 1 hour of each other), to the soil of the agricultural field being treated. In certain embodiments of the methods described herein, the semi-humic material is applied to the soil with less than about three hours, or less than about two hours, or less than about one hour, or less than about 30 minutes, or less than about 20 minutes, or less than about 10 minutes, or less than about 5 minutes before or after applying the fertilizer. In certain embodiments, the fertilizer and the semi-humic material, or an aqueous composition comprising the same, are pre-mixed and applied as a single composition. Application of the fertilizer and the semi-humic material, or a composition comprising the same, within such a time window can avoid excessive nitrogen and phosphorus depletion and accomplish more effective and efficient nutrient delivery to the plantings.

In one embodiment, the semi-humic material (humic composition having a low molecular weight humin component), or an aqueous composition comprising the same, and the fertilizer are pre-mixed in solution prior to the addition to the soil. Their respective concentrations may range from 1% to about 20%, or from 1% to about 15%, or from 1% to about 10% by weight of the semi-humic composition to fertilizer. In certain embodiments, the weight/weight ratio of the semi-humic composition to fertilizer are from about 1:100 to about 2:1. Exemplary ratios further include about 1:90, about 1:75; about 1:60; about 1:50; about 1:25; about 1:10; and about 2:1. In certain embodiments, the ratio is 1:1. In certain embodiments, when the fertilizer is mixed with ammonium thiosulfate (AN-20) or ammonium polyphosphate (10-34-0), the semi-humic material, or an aqueous composition comprising the same, is diluted with an equal volume of water.

The amount of semi-humic material, or an aqueous composition comprising the same, applied to the soil may vary, and typically ranges from about 0.001 mL to about 100 mL of the semi-humic composition kilogram of soil, or about 0.1 mL of the semi-humic material per kilogram of soil, or about 0.03 mL per kilogram of soil, or about 0.05 mL per kilogram of soil, or about 1 mL of the semi-humic material per kilogram of soil, or about 10 mL of the semi-humic material per kilogram of soil, or about 20 mL of the semi-humic material per kilogram of soil, or about 30 mL of the semi-humic material per kilogram of soil, or about 40 mL of the semi-humic material per kilogram of soil, or about 50 mL of the semi-humic material per kilogram of soil. In certain embodiments, the amount of the semi-humic material applied to the soil ranges from about 0.001 mL to about 50 mL of the semi-humic material per kilogram of soil.

EXAMPLES

In each of the following Examples, the semi-humic material and compositions comprising the same, as used herein are prepared as described below.

Ag-3FL can be prepared as follows. 5-20 parts of leonardite powder was combined with 50-75 parts of water at a temperature of 195° F. or higher. 10-20 parts of carbohydrate or chelating agent (the carbohydrate or chelating agent can be any one or more of a sodium, potassium, ammonium, copper, iron, magnesium, manganese, zinc, calcium, lithium, rubidium or cesium salt of ethylene diamine tetraacetic acid, hydroxyethylene diamine triacetic acid, diethylene triamine pentaacetic acid, nitrillo triacetic acid, or ethanol diglycine, an ammonium or metal salt of a variety of an organic acid, such as citric acid, galactaric acid, gluconic acid, glucoheptoic acid, glucaric acid, glutaric acid, glutamic acid, tartaric acid, and tartronic acid) was added. A temperature of 150° F. was maintained during subsequent addition of carbohydrate or chelating agent. The components were mixed for 6 hours, settled in a suitable container for 4 days. The supernatant was then removed and the pH adjusted with about 1-3 parts of a strong base. The components were mixed for 1 hour, allowed to settle in a suitable container for 45 days at a temperature of 80-85° F., the supernatant removed, the liquid pumped through separator and filtered through a 100 mesh filter.

In each of the following Examples where an aqueous composition comprising the semi-humic composition and an NDRS, the NDRS used is SP-1 and can be prepared as described below.

SP-1 can be prepared by adding 14 parts (by weight) of dry leonardite ore to 52 parts of water, previously heated to a temperature of 185° F. A carbohydrate or a carboxylate metal salt such as potassium tartrate (16 parts by weight) is added and mixed for 2-3 hours. The liquid composition is oxygenated for 270 minutes and 10 parts of a strong base is added followed by the removal of the insoluble components of leonardite ore. The liquid composition is then isolated and pH adjusted with 1 part strong base. SP-1 can be used to make the Ag-3FL composition described below.

In each of the following Examples, the soils used are shown in the Table below.

| Location | Soil series name | % Sand | % Silt | % Clay | % organic matter | pH |
|---|---|---|---|---|---|---|
| Ohio | Crosby silt loam & Brookston silty clay loam | 32.7 | 41.9 | 25.4 | 2.5 | 6.5 |
| Wisconsin | Milford silty clay loam | 20 | 40 | 40 | 4.1 | 6.6 |
| California | Panoche Clay Loam | 29 | 25 | 46 | 1.1 | 7.7 |
| Indiana | Treaty silty clay loam & Crosby silt loam | 31 | 48 | 21 | 2.0 | 6.6 |
| Tulare | Colpien Loam | 39 | 44 | 17 | 3.1 | 7 |
| Kern | Exeter Sandy Loam | 66 | 21 | 13 | 0.58 | 6.2 |
| Fresno | Cerini Clay Loam | 29 | 41 | 30 | 0.37 | 7.9 |
| Monterey | Pacheco Clay Loam | 31 | 41 | 28 | 1.1 | 7.4 |
| McCurdy | Tranquillity Clay | 9 | 32 | 60 | 1.6 | 7.8 |

Example 1: 45 Day Aging of AG-3FL Results in an Increase in the Fulvic-Like Fraction Introduction The AG-3FL process is summarized in FIG. 1.

Methods

Fulvic-Like Fraction

Extracts from leonardite and other humic substances are defined as humic acid, fulvic acid or humin based on the following operational definitions[1]:

1. Humic Acid: the base extracted, acid precipitated fraction
2. Fulvic Acid: the base extracted, acid soluble fraction
3. Humin: the base extracted, insoluble fraction The CDFA Humic Acid Method[2] is currently the only widely accepted method for quantifying Humic Acid and is available to customers at some soil and fertilizer labs. In the CDFA Humic Acid Method, the Fulvic Acid and Humin fractions are discarded. During the 45 day aging period of AG-3FL the Fulvic-Like fraction, the fraction similar to a fulvic acid extraction from a genuine humic substance, was quantified. The Fulvic-Like fraction was measured based on the supernatant after acidification and centrifugation of the sample. This fraction as well as the Humic and Humin fractions are referred to as Humic-Like, Humin-Like and Fulvic-Like because the initial solution contains more than just humified organic matter. As is typical of the CDFA Humic Acid Method, the Fulvic-Like fraction was measured as a dry weight percentage of the original sample.

Results

Increase in Fulvic-Like Fraction on the Production Scale

Figure 2:
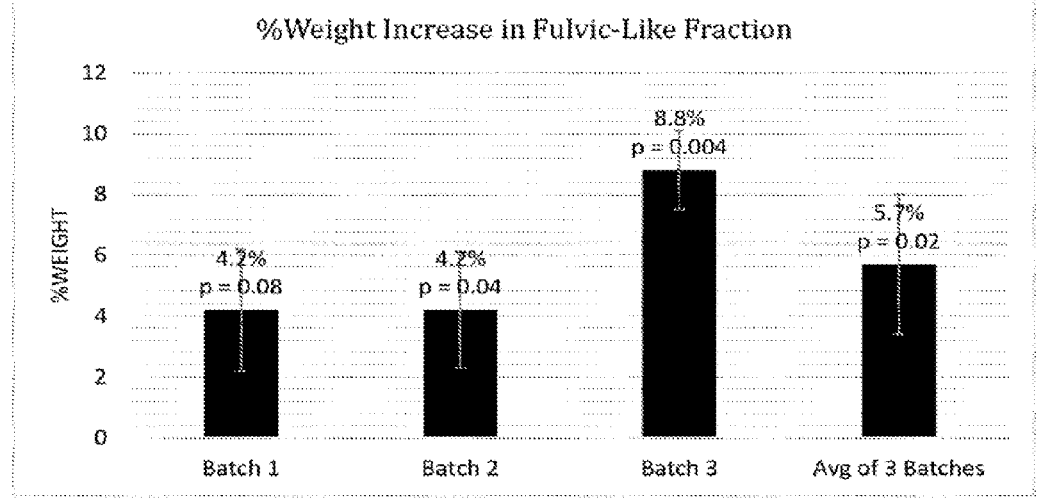
FIG. 2 shows an increase in carbon attributed (at least in part) to the fulvic-like component (as % weight).

The resulting composition after the 45-day process is called Ag-3FL. The Fulvic-Like fraction was quantified at the beginning and end of the AG-3FL 45 day aging period using the CDFA Humic Acid Method as described in Methods. FIG. 2 contains results from three batches of AG-3FL. Standard Deviations and p values displayed in FIG. 2 are based on four independent preparations at both the beginning and end of the 45 day aging process for each batch. The percentage increase in Fulvic-Like component is represented in units of weight/weight of original sample.

Results for three batches show an average increase of 5.7%±2.3% (w/w) Fulvic-Like fraction during the 45 day ageing period.

Validation on the Laboratory Scale

Six replicate samples were collected in 16 oz. jars at the beginning of the aging process. At three time points (Initial, 20 Day, 45 Day) two jars were vigorously homogenized and then centrifuged at 4500 rpm's for 12 minutes. The residue left after centrifugation (centrate) and supernatant were then isolated, combined and fractionated with the CDFA Humic Acid Method. Rather than determining the Fulvic-Like fraction on a weight per weight basis, each humic fraction was quantified on a % Carbon basis (Carbon/Weight). By measuring and comparing the increase on a Carbon weight basis, any artifacts that may have shown up when measuring on the w/w basis (inorganic/ash) is removed. The analytical method described is commercially available at Huffman Labs and was co-developed with the USGS.

Figure 3:
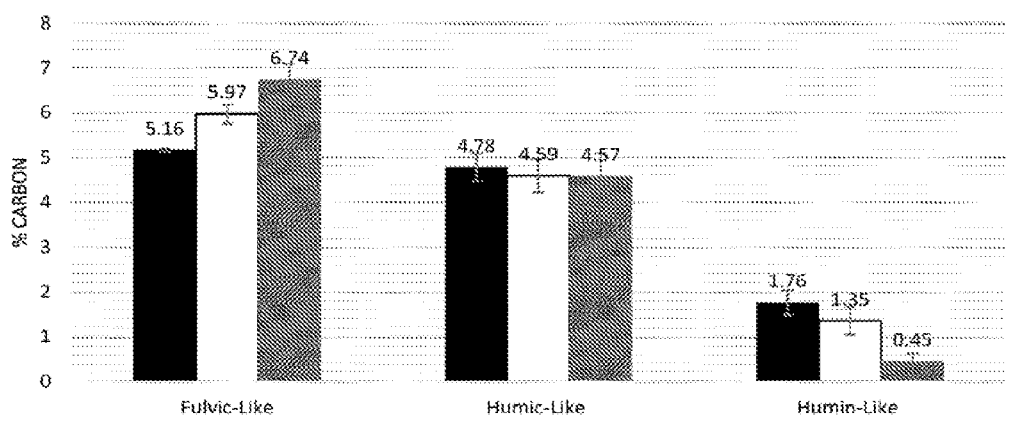
FIG. 3 shows all humic fractions in the combined supernatant and centrate as % carbon.

Results from FIG. 3 show an absolute increase of 1.5% Carbon which equates to a percentage increase of about 31% Carbon for the Fulvic-Like fraction of the combined supernatant and centrate over the 45 day aging period. The Humic-Like fraction remains fairly steady, while the Humin-Like fraction loses 1.3% Carbon or a percentage decrease of 74% Carbon. This shows that the composition Ag-3FL has a low molecular weight humin component.

Figure 4:
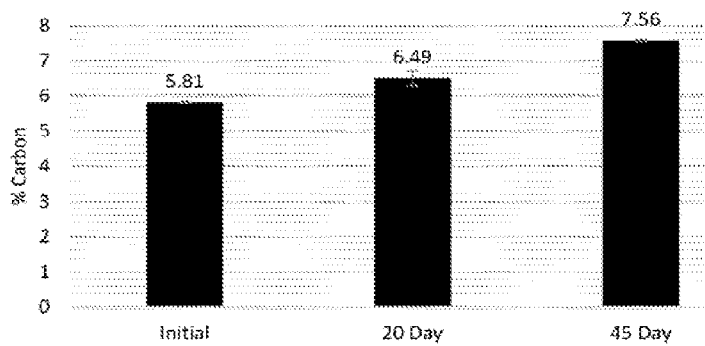
FIG. 4 shows the fulvic fraction of the supernatant as % carbon.
Figure 5:
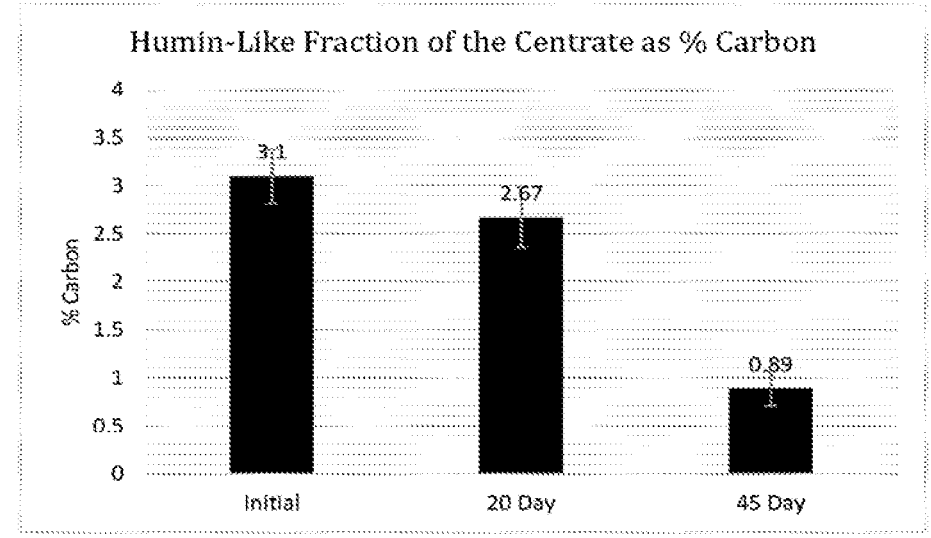
FIG. 5 shows the humin fraction of the centrate as % carbon.

FIG. 4 shows that the increase in the Fulvic-Like fraction is clearly captured in the Supernatant, which is to be expected since the Fulvic-Like fraction is water soluble. This increase corresponds to a decrease in the Humin-Like fraction of the Centrate (FIG. 5). ANOVA F values were greater then F critical at an alpha of 0.05 for fulvic-like and humin-like results within groups in FIG. 3 and between groups for FIGS. 4 and 5. Standard Deviations shown in FIGS. 3, 4 & 5 are based on quadruplicate runs of the same sample on a Total Carbon analyzer.

Conclusion

The 45 day aging of AG-3FL results in an increase in the Fulvic-Like Fraction, and thus provides a semi-humic composition, which can be obtained from leonardite ore, having a low molecular weight humin component. There is evidence to support that a conversion, carbon recombination or some other transformation of the Humin-Like fraction in the residue from the aging process correlates with the increase in the Fulvic-Like fraction in the supernatant.

References

1. Aiken, George R., et al. *Humic substances in soil, sediment, and water: geochemistry, isolation and characterization*. John Wiley & Sons, 1985.
2. California Department of Food and Agriculture (1999) *Humic Acid Method*, Sacramento, Calif.

Example 2: Molecular Characterization of AG-3FL, Pre-Aged AG-3FL and a Standard Humic Extract Fourier Transform Ion Cyclotron Resonance Mass Spectrometry (FTICR-MS) is a powerful tool for the molecular characterization of complex organic mixtures. The ultra-high mass resolution and mass accuracy of FTICR-MS allows for the identification of elemental compositions for thousands of species, with minimal sample preparation. For singly charged ions of <700 Da, unambiguous molecular formulas can be assigned directly from the measured mass if ~1 ppm mass accuracy can be achieved[1]. In this example Pre-Aged AG-3FL, AG-3FL and a Standard Humic Extract were characterized with FTICR-MS.

Methods

Sample Preparation and Instrumentation.

Each sample was run in positive and negative electrospray ionization (ESI) and positive and negative laser desorption ionization (LDI) modes. Due to the low intensity of ions resulting from positive LDI, those spectra were not processed. For ESI, samples were diluted to 0.01% (v/v) in a 1:1 (v/v) acetonitrile and water solution. For LDI, a drop of sample was placed on a stainless steel LDI plate and allowed to dry for about an hour. Samples were then run on a 15T SolariXR FTICR-MS (Bruker Daltonics) that was externally calibrated with standard calibration solutions. The ESI and LDI source conditions are displayed in Tables 1 and 2.

TABLE 1

| Polarity | Flow Rate (µl/hr) | Capillary Voltage (V) | End Plate Offset (V) | Nebulizer Pressure (bar) | Dry Gas Flow (L/min) | Dry Temp (° C.) | FID Transient |
|---|---|---|---|---|---|---|---|
| ESI Positive | 120 | 4500 | −500 | 0.5 | 4 | 180 | 4M |
| ESI Negative | 120 | 4500 | −500 | 0.5 | 4 | 180 | 4M |

TABLE 2

| Polarity | Laser | Plate Offset (V) | Deflector Plate (V) | Laser Power | Laser Shots/Scan | Smart Walk (µm) | FID Transient |
|---|---|---|---|---|---|---|---|
| LDI Negative | Yag/Nd, 351 nm | −100 | −200 | 30% | 100 | 500 | 4M |

Data Analysis.

Post-acquisition, spectra were internally calibrated using unambiguously determined m/z values, including carbon clusters that were manually identified. Mass lists were then filtered to exclude any peaks below a signal to noise threshold of 9. Further, only masses in the 120-500 m/z range were used to determine molecular formulas since mass accuracy is highest in the lower mass range for FTICR-MS. To generate molecular formulas, the maximum error allowed between the measured and theoretical m/z from the calculated molecular formula was set to 1.0 ppm. In addition, calculated molecular formulas were screened to exclude Oxygen to Carbon ratios of greater than 1.5 and Nitrogen to Carbon ratios of less than 0.6, since these are unlikely to occur in natural organic matter. The O/C and N/C cutoffs were similar to those determined by Stubbins, et al. (2010)[2].

Samples.

The samples in Table 3 below were analyzed by the methods described above. For each sample type, three separate batches were analyzed. The three batches of HA and AG-3FL were produced on the Production Scale. The Pre-Aged AG-3FL batches were produced in the laboratory as previously described in Example 1.

TABLE 3

| Sample Type | Description |
|---|---|
| HA | Standard, commercially available Humic Extract. |
| Pre-Aged AG-3FL | AG-3FL at the beginning of the 45 Day Ageing Process. |
| AG-3FL | AG-3FL at the end of the 45 Day Ageing Process. |

Molecular formulas consistently identified in all three of the batches associated with each sample type were determined to be characteristic for the sample type. If a molecular formula was identified in only one or two of the three batches per sample type, the formula was not considered characteristic of that sample type and was not assigned to it. The differences seen in batches within sample types were attributed to raw material and processing variability.

Results

Table 4 below displays the number of molecular formulas assigned to each sample type. The 45 day aging process, which results in AG-3FL, produces more molecular formulas compared to the Pre-Aged AG-3FL sample. For all three sample types combined, a total of 2030 molecular formulas were identified, with most of those assigned to HA.

TABLE 4

| Sample Type | Number of Molecular Formulas (120-500 m/z) |
|---|---|
| HA | 1184 |
| Pre-Aged AG-3FL | 226 |
| AG-3FL | 620 |

Figure 17:
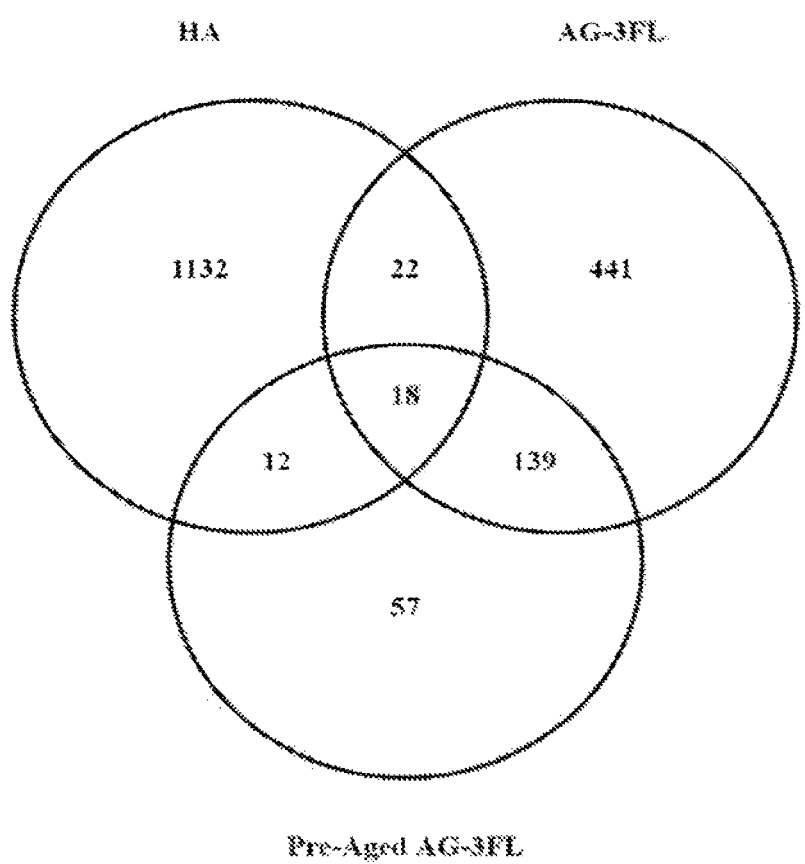
FIG. 17 shows a Venn diagram that shows the number of overlapping and unique molecular formulas assigned to each sample type.

FIG. 17 displays a Venn diagram that shows the number of overlapping and unique molecular formulas assigned to each sample type. Only 52 out of the 2030 molecular formulas are consistently shared between all batches of HA and both Pre-Aged AG-3FL and Ag-3FL.

Further, AG-3FL has been assigned 441 unique molecular formulas that are not consistently present in either Pre-Aged AG-3FL or HA.

The molecular formulas determined by FTICR-MS can be categorized into compound classes, with some overlap, according to Oxygen to Carbon and Hydrogen to Carbon ratios[4]. Compound classification boundaries are displayed in Table 5.

TABLE 5

| Compound Type | H:C Ratio | O:C Ratio |
|---|---|---|
| Lipid, Protein and Other Aliphatic (LPOA) | 1.5-2.2 | 0-0.67 |
| Lignin | 0.7-1.5 | 0.1-0.67 |
| Condensed Aromatic | 0.2-0.7 | 0-0.67 |
| Carbohydrate | 1.5-2.4 | 0.67-1.2 |
| Unsaturated Hydrocarbon | 0.7-1.5 | 0-0.1 |

Table 6 classifies assigned molecular formulas into compound classifications as a percent of total molecular formulas, for each sample type. The actual number of assigned molecular formulas is presented in parentheses. The compound classification percentages for the HA sample type are clearly very different compared to both Pre-Aged AG-3FL and AG-3FL. HA has a higher percentage of Lignin, Condensed Aromatic and Unsaturated Hydrocarbon. In addition, HA has only 1 assigned molecular formula in the Carbohydrate class.

TABLE 6*

| Sample Type | LPOA | Lignin | Condensed Aromatic | Carbohydrate | Unsaturated Hydrocarbon | Uncategorized |
|---|---|---|---|---|---|---|
| HA | 25.5% (302) | 26.6% (315) | 28.1% (303) | 0.08% (1) | 12.2% (144) | 9.54% (113) |
| Pre-Aged AG-3FL | 54.0% (122) | 7.96% (18) | 18.6% (42) | 5.75% (13) | 1.76% (4) | 12.8% (29) |
| AG-3FL | 58.7% (364) | 10.5% (65) | 12.4% (77) | 4.67% (29) | 2.90% (18) | 11.7% (73) |

*Percentages of compound classifications for each sample type do not add up to 100% due to overlap of compound classification boundaries The compound classification percentages for AG-3FL are more similar to Pre-Aged AG-3FL than to HA. However, 441 or 71% of the assigned molecular formulas for AG-3FL are unique. The compound classification of the unique molecular formulas assigned to AG-3FL are shown in Table 7. Over half of the unique formulas assigned to AG-3FL fall in the LPOA (Lipid, Protein and Other Aliphatic) class.

TABLE 7*

| Sample Type | LPOA | Lignin | Condensed Aromatic | Carbohydrate | Unsaturated Hydrocarbon | Uncategorized |
|---|---|---|---|---|---|---|
| 441 Unique AG-3FL Formulas | 56.2% (248) | 10.4% (46) | 13.6% (60) | 3.85% (17) | 3.62% (16) | 13.1% (58) |

*Percentages of compound classifications for each sample type do not add up to 100% due to overlap of compound classification boundaries FIG. 18 is an example of ESI positive spectra from an LPOA class methylation series uniquely assigned to AG-3FL. The 2 peaks shown have calculated molecular formulas that are within ±0.1 ppm error, compared to the measured m/z. The measured mass difference between the 2 peaks in FIG. 3 (222.18286–222.14644) is 0.0364, which is a hallmark of $O/CH_4$ replacement. The actual structure of the molecular formulas cannot be determined since there are many possible isomers.

Figure 19A:
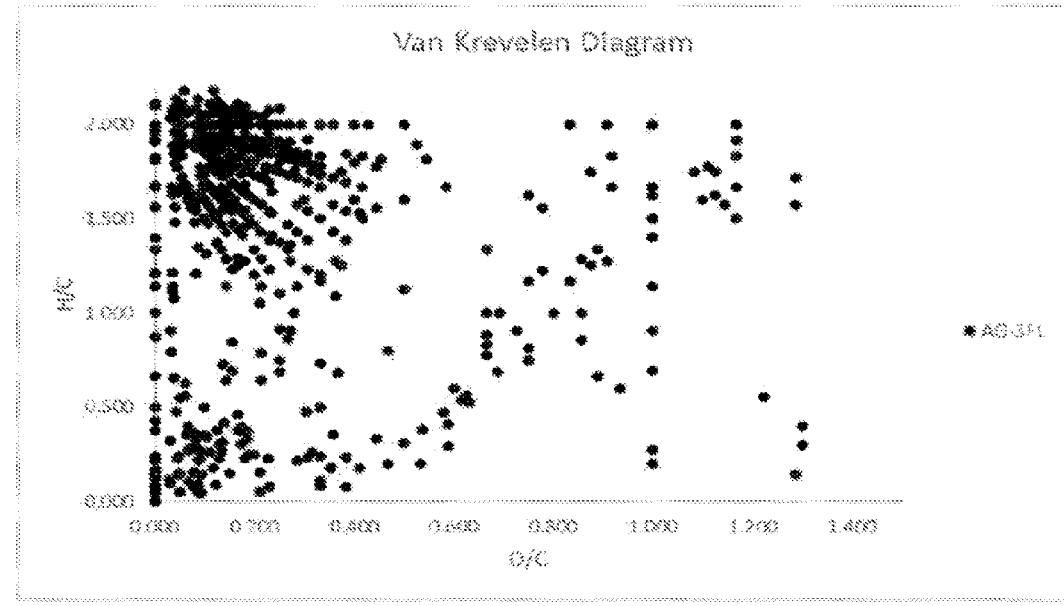
FIG. 19A shows a Van Krevelen Diagram of AG-3FL.
Figure 19B:
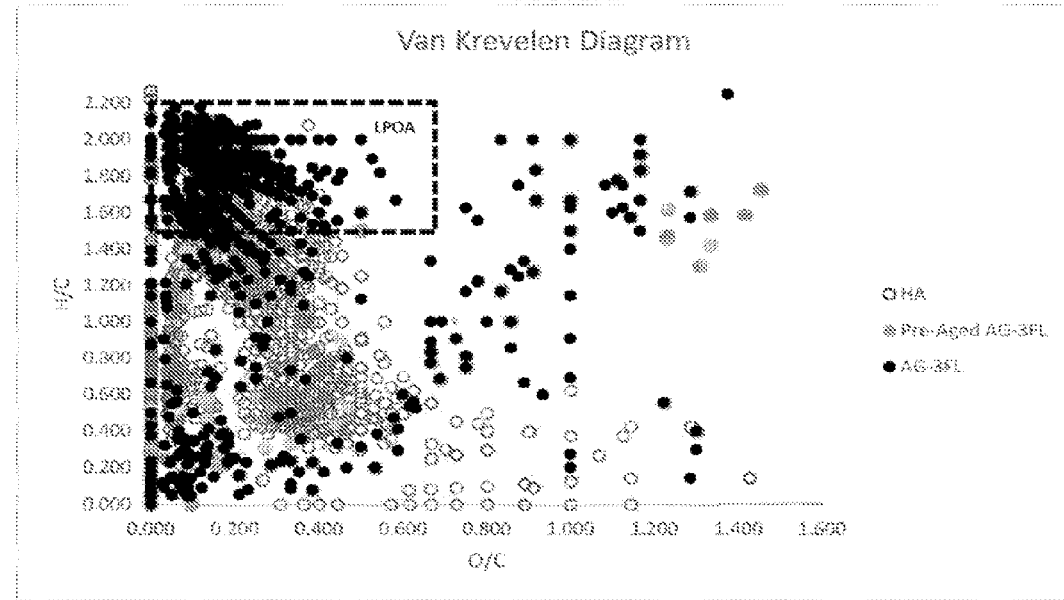
FIG. 19B shows an overlay of the Van Krevelen Diagrams of humic acid (HA), pre-aged AG-3FL and AG-3FL.

Compared to raw spectra, Van Krevelen diagrams are a more convenient visual representation of FTICR-MS data. Each point in a Van Krevelen diagram represents a molecular formula with a defined H:C and O:C ratio[5]. FIG. 19A shows a Van Krevelen diagram of AG-3FL as described herein. In FIG. 19B, a Van Krevelen Diagram that includes data from AG-3FL, Pre-Aged AG-3FL and HA sample types is shown. The LPOA region, which contains most of the unique molecular formulas assigned to AG-3FL, is defined.

Conclusion

The ultra-high resolution and mass accuracy of FTICR-MS has allowed for the identification of molecular formulas between m/z 120-500 in three representative batches of Pre-Aged AG-3FL, AG-3FL and HA. By assigning molecular formulas that are consistently present in all 3 batches to each sample type, the samples were characterized. Results show that Ag-3FL and Pre-Aged AG-3FL have fewer assigned molecular formulas and very different compound classification percentages as compared to HA. In addition, AG-3FL has more assigned molecular formulas compared to Pre-Aged AG-3FL. Finally, although the compound classification percentages were somewhat similar in Pre-Aged AG-3FL and AG-3FL, 441 unique molecular formulas are assigned to AG-3FL of which over half are of the LPOA class. As can be seen in FIG. 19B, the molecular composition of the aged AG-3FL is different from both the pre-aged AG-3FL and humic acid (HA). It is contemplated that at least some of the beneficial effects of the semi-humic material described herein is due to the molecular composition of the aged AG-3FL.

References

1. Marshall, Alan G., Christopher L. Hendrickson, and George S. Jackson. "Fourier transform ion cyclotron resonance mass spectrometry: a primer." *Mass spectrometry reviews* 17.1 (1998): 1-35.
2. Stubbins, Aron, et al. "Illuminated darkness: Molecular signatures of Congo River dissolved organic matter and its photochemical alteration as revealed by ultrahigh precision mass spectrometry." *Limnology and Oceanography* 55.4 (2010): 1467-1477.
3. Oliveros, J. C. (2007-2015) Venny. An interactive tool for comparing lists with Venn's diagrams. https://bioinfogp.cnb.csic.es/tools/venny/index.htm
4. Ikeya, Kosuke, et al. "Characterization of the chemical composition of soil humic acids using Fourier transform ion cyclotron resonance mass spectrometry." *Geochimica et Cosmochimica Acta* 153 (2015): 169-182.
5. Kim, Sunghwan, Robert W. Kramer, and Patrick G. Hatcher. "Graphical method for analysis of ultrahigh-resolution broadband mass spectra of natural organic matter, the van Krevelen diagram." *Analytical Chemistry* 75.20 (2003): 5336-5344.

Example 3: Ammonia Volatilization and Nitrogen Mineralization

A closed, dynamic soil chamber assay was developed to measure both soil ammonia volatilization and mineralized nitrogen content in soil. Several treatments were combined with urea, applied at field relevant rates and evaluated.

Methods

A formulation containing AG-3FL was prepared as follows:

| Name | Material Constituents (by weight) |
|---|---|
| SP-4 | 5% Ag-3FL 95% SP-1 |

100 grams of Panoche Clay Loam soil with a bulk density of about 1.4-1.6 $g/cm^3$ was sieved and placed in an air tight jar equipped with a septum.

Figure 6:
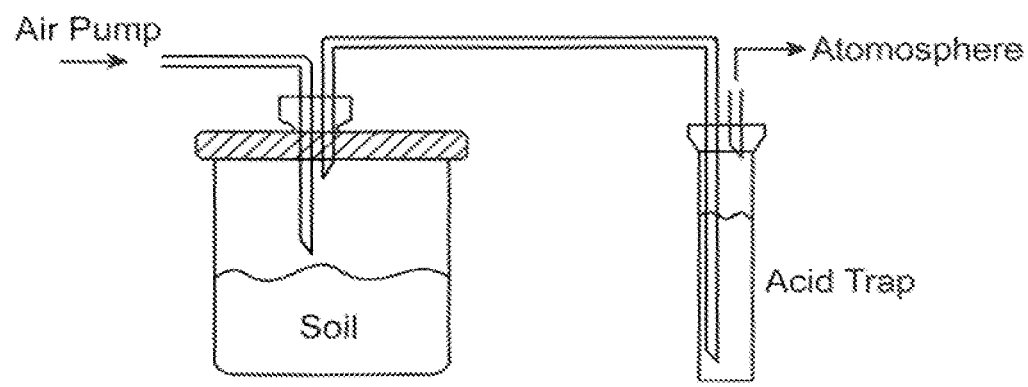
FIG. 6 is a schematic of the soil chamber apparatus.

A Boric Acid trap with indicator was used to collect free ammonia.[1,2,3] Air flow into the system was carefully monitored to ensure consistency. FIG. 6 describes the soil chamber apparatus.

10 mL of water was added to the soil in each chamber and allowed to incubate for 2 days. Next, experimental treatments were applied to soil chambers in triplicate. Every 48 hours the acid trap was titrated with dilute HCl to determine the amount of ammonia volatilization.[1,2,3] Once ammonia volatilization slowed to a negligible rate, the soils from each triplicate experiment were combined, frozen and shipped to an analytical lab for quantification of nitrate.

Results

Soil Ammonia Volatilization & Nitrogen Mineralization

The broadcast application rates used in the assay are shown in Table 8. A total of 3 Gallons/Acre of each treatment and 150 lbs of Urea-Nitrogen per acre was used to represent expected field rates. Total volume applied to each soil chamber per treatment was 15 mL and each treatment was run in triplicate.

TABLE 8

| Treatment | Treatment Rate | Urea Rate | Application Type |
|---|---|---|---|
| Urea Only | — | 150 lbs. of Urea-N/Acre | Broadcast |
| Urea + SP-4 | 3 Gallons/Acre | 150 lbs. of Urea-N/Acre | Broadcast |
| Urea + SP-1 | 3 Gallons/Acre | 150 lbs. of Urea-N/Acre | Broadcast |

Results in FIG. 7 show that Urea+SP-4 and Urea+SP-1 treatments have less nitrate in soil after 216 hours (9 days), compared to the Urea treatment. On the other hand, ammonia volatilization from the Urea+SP-4 and Urea+SP-1 treatments is almost equal to the Urea treatment.

Conclusion

Broadcast application rates of SP-4 and SP-1 applied with urea reduce soil nitrate concentrations by over 8% after 216 hours (9 days), compared to urea alone.

References

1. Miles, D. M., et al. "Instrumentation for evaluating differences in ammonia volatilization from broiler litter and cake." *The Journal of Applied Poultry Research* 17.3 (2008): 340-347.
2. Cruz, Gregorio. "Boric Acid in Kjeldahl Analysis." *Journal of Chemical Education* 90, 12 (2013): 1645-1648.
3. Soares, Johnny Rodrigues, Heitor Cantarella, and Marcella Leite de Campos Menegale. "Ammonia volatilization losses from surface-applied urea with urease and nitrification inhibitors." *Soil biology and biochemistry* 52 (2012): 82-89.

Example 4: Carbon Dioxide Evolution and Nitrogen Immobilization Changes with Treatment a. Materials and Methods Surface soil was collected from cultivated agricultural land. This soil was chosen because it represents a typical soil used for crop production in the U.S. Tranquility Clay was collected and once air dried, passed through a 2 mm (10 mesh) screen. All soil was homogenized in a cement mixer with equal weight of fine sand to increase drainage. Before weighing out soil into individual cups, ⅛" (85 g) COARSE sand (HCl washed) was placed onto a Whatman Fast Flo filter paper at the bottom of the cup and cellulose coffee filter between coarse sand and soil (cups are 500 mL Nalgene Rapid Flow vacuum filter units with the fine membrane removed from each) Then 435 g of soil was packed into cups to the 350 ml line for a Bulk Density of 1.33 g/cc. Soil was added in 4 increments of 109 grams and once each was packed with a polyacrylate pestle, the surface was lightly stirred (scarified) before the next 100 g increment was added.

Before starting the incubation experiments, samples were preconditioned with 130 mL of 0.01M $CaCl_2$ and incubated at 77° for 5 days. Lids are placed over cups, but propped up on the edge to allow air flow on every evaluation day for 3 hrs. All cups were leached with 400 mL of 0.01 M $CaCl_2$ solution after 5 days of incubation and allowed to drain for 2 days before treatments were applied.

Treatments are listed below:
1) Water only Control
2) N @ 100 lbs from Ammonium Sulfate
3) SP-4 @ 10 gpa+100 lbs N from Ammonium Sulfate Both treatments are mixed with DeIonized water. Neither Water nor N only Control received any other material, but were mixed and sampled exactly like the treated soil. Each treatment was replicated 2 times. Each cup has surface area of 0.081 sq ft.≈0.0000014332 ac. Treatments were added in a total volume of 20 ml solution to top of cups, allowed to soak in for 1 hour then mixed into the top 1" of soil.

Commercial "Sol Vita $CO_2$ probes" were put in identical 2 replicates of similar cups for each treatment, covered with a tight fitting lid and sealed with electricians tape around the lids for an air tight seal. Each probe was removed after 24 hours and reading of the probes performed immediately. All cups were left open 30 min for air exchange with ambient conditions then new probes inserted, covered and sealed. This was repeated for each of the first 6 days of the experiment.

Samples of soil in cups will be taken at 0, 3, 7, 10, 14 days after treatment for $NO_3$ and $NH_4$. After each week, 20 ml of DI water replaced to cover evaporation loss over previous 7 days. Soil samples were taken to a commercial lab the day the cups are sampled, and dried at 130°. Nitrate and ammonium were extracted with 2M KCl and analyzed through a Flow Injection Analyzer.

Results and Discussion

With only 2 replicates, results were more variable than preferred, but still showed statistical significance at the P=0.10 level and/or strong numerical trends. Significantly more $CO_2$ was released through microbial respiration in the SP-4+N treated cups than in the fertilizer alone over the 6 days of the test, FIG. 8. This is a 25.9% increase showing a decided stimulation from treatment. $CO_2$ peaked at 4 DAT with the SP-4 treatment. There was a 60% increase in $CO_2$ evolved at this peak reading. The elevated $CO_2$ measured indicates increased microbial growth which requires additional N for the microbes.

Figure 9:
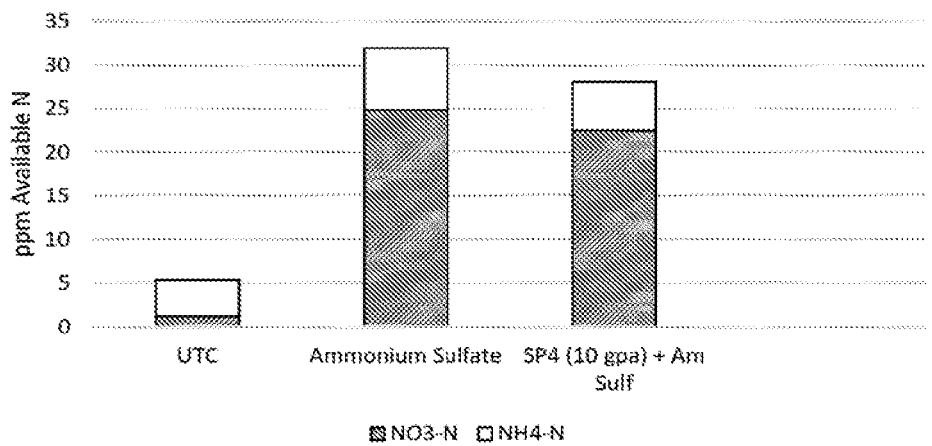
FIG. 9 shows the difference in available nitrogen forms 7 days after treatment.

Soil N analysis results were correlated with $CO_2$ increases, as shown in FIG. 9. By the 7 day sampling, nitrate with SP-4 treatment was significantly lower than fertilizer alone. Ammonium was also reduced with the SP-4 treatment, coinciding with the increased microbial activity. This is expected when microbial growth increases, microbes pull Nitrogen from the soil for their metabolism (immobilization). At 10 days, ammonium was still somewhat behind the fertilizer standard and nitrate level had increased as the soil microbes now have more available N to mineralize from that which had been immobilized in the first few days after treatment. Levels of nitrate and ammonium are equal at 14 days after treatment so there is no lack of crop available nitrogen.

Example 5: Effects of NDRS on Phosphorus (P) and Nitrogen Levels in Surface Soil Soil phosphorus runoff likelihood was found to be closely correlated to the standard agricultural soil tests appropriate for the soil pH range (Bray or Olsen's). It was recently found that P content in the top 2 cm of soil predicted the amount of dissolved reactive phosphate (DRP or runoff P) in runoff (Bundy, undated). In this example, these methods were used to test the effect of the composition as described herein on phosphorus runoff.

Methods

Tranquillity Clay soil was screened to 2 mm and mixed very well with an equal weight of fine sand for improved drainage. Coarse sand and a cellulose filter were placed at the bottom of each cup for air flow. Cups are 500 ml Nalgene Rapid Flow vacuum filter units. Soil was packed into cups with a pestle for a Bulk Density of 1.4 g/cc.

Prior to adding treatments, samples were preconditioned with 0.01M $CaCl_2$ and incubated at 77° F. for 7 days.

All treatments were added to a soil surface roughened to 1 cm.

Treatments, replicated 3 times were as follows:
1) No Fertilizer Control (1000 gpa water)
2) 18-46-0 @ 500 lbs/acre (90 lbs N and 100 lbs P/acre respectively) then 1000 gpa water
3) SP-4 5 gpa+995 gpa water over 18-46-0 @ 500 lbs/acre
   1. 0.42 g of 18-46-0 prills for each cup, were ground in portable coffee grinder to medium fine powder.
   2. Powdered fertilizer prills were spread uniformly over soil surface for Treatments 2 and 3.
   3. For Treatments 1 & 2 deionized water only at 7.03 mL/cup (1000 gpa) was spread uniformly over soil surface.
   4. Deionized water was mixed with SP-4 for Treatment 3 and applied as No. 3 above.
   5. Treatments sat on soil for 18 hours, then water applications (6 below) began.
   6. To simulate a heavy rainfall, a dilute mixed chloride salt solution (K, Mg, Na) was applied in 5 increments over 2 hours. The 300 mL used for each cup approximated 2½" of rainfall.
   7. Soils were allowed to equilibrate and dry for 48 hours.
   8. To sample, cups were inverted onto wax paper then righted for each of the three 2 cm depth increments to be removed from the one below it.
   9. Each of the 3 depth segments of soil was analyzed for Phosphate-P by the $NaHCO_3$ (Olsen's) extraction.

Soil analysis results (FIG. 10) indicate that SP-4 significantly lowered quantities of soil test phosphorus from the surface 2 cm of soil compared to the fertilizer only treatment. This test has been demonstrated to be highly correlated to the "dissolved reactive phosphorus" which is the main problem for run off into rivers and lakes. The lower surface 2 cm of soil P indicates reduced P runoff potential. It is contemplated that chemical bonding/interaction between the SP-4 and the fertilizer P increases the mobility of P in soil, where it is widely considered to be immobile. Increased phosphorus mobility would increase its movement into the soil with water. Additionally, a statistically significant quantity of the fertilizer P was redistributed to the 2-4 cm depth, where it is recognized to not be a significant runoff concern. The P level with SP-4 treatment at the 4-6 cm level was also increased versus the fertilizer only treatment. Again demonstrating that fertilizer P moved below the runoff susceptible depth with SP-4 application. Both treatments with fertilizer showed significant increase from the water control. The lab analysis performed is not sufficient for a mass balance calculation of all of the fertilizer P as it only measures the soluble and slightly soluble P (labile pool). It is contemplated that the addition of SP-4 to fertilizer P may cause the P to move downward from the point of application and/or change its solubility is unknown. The 18% reduction of Phosphorus in location and form ready to run off the field is significant.

Figure 11:
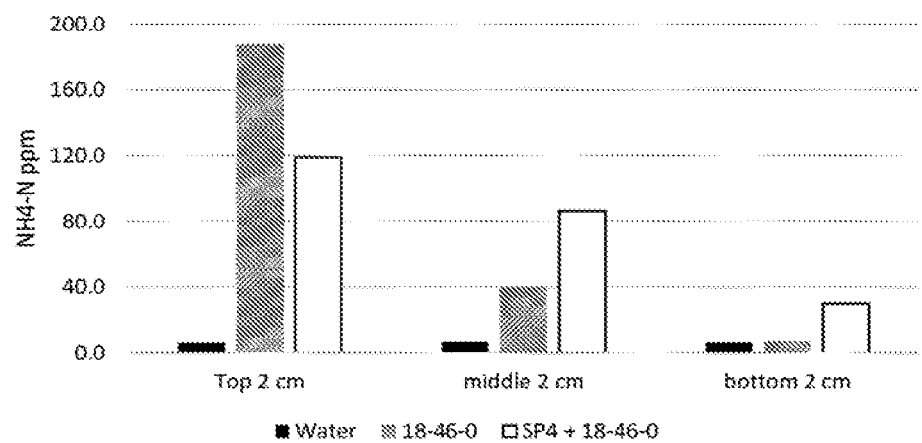
FIG. 11 shows the effect of a composition comprising the semi-humic material (i.e., SP-4) on ammonium in surface soil.

Similar results were observed with ammonium, FIG. 11, extracted with 2 M KCl. Lab data indicate that SP-4 removed significant quantities of ammonium from the surface soil compared to the fertilizer only treatment. As with the phosphorus, this results in reduced N runoff potential. Ammonium is not considered to be readily leachable downward from the soil surface due to its interactions with cation exchange sites on soil particle. It is contemplated that binding of SP-4 to the ammonium and thus limiting the exchange site interactions is the most reasonable way to achieve a 36% reduction in average surface soil ammonium level. Some of the fertilizer N was also redistributed to the 2-4 cm depth, where it is recognized to not be a significant runoff concern. The N levels from with treatment are significantly higher than fertilizer only. The N level from treatment at the 4-6 cm level was elevated versus the standard and the water control.

By the end of this experiment, significant nitrification of fertilizer N had not yet begun. Soil nitrate levels showed no differences between any treatments at any of the 3 depths.

The performance of SP-4 to reduce both phosphate and ammonium in the most run off susceptible 0-2 cm depth of the soil column is strongly indicative of its ability to reduce fertilizer runoff from heavy rains or irrigations in field situations.

References

Bundy, L. G. (Undated). http://www.soils.wisc.edu/extension/materials/P_Understanding.pdf

Example 6: Field Experiments in Corn to Measure Ammonia Gas and Grain Nitrogen Content This field experiment involved corn grown in the field using standard agricultural practices used in production agriculture, treated with materials containing the new substance at varying rates, and urea nitrogen at varying rates. Response variables related to the loss or conservation of nitrogen in the soil-plant system were tested, including $NH_3$ evolved from the soil, $NO_3^-$, $NH_4^+$ in soil, as well as nitrogen content in corn biomass and grain.

Corn was planted in rows spaced 30 inches on center in the field during Spring 2015 in Ohio (OH) and Wisconsin (WI). At the Ohio site, the soils predominantly consisted of a Crosby silt loam with a lesser representation by a Brookston silty clay loam. At the Wisconsin site, the soils predominantly consisted of a Milford silty clay loam and a Del Rey silt loam. After planting and before corn emergence, a surface spray application to the soil surface was made containing SP-4 and urea solution made by dissolving urea in water in all combinations at the following rates:

1) N=0, 62.5, 87.5 lbs N/acre, applied as urea dissolved in water; and
2) SP-4=0, 1.25, 2.5, 5 gallons/acre.

When the corn reached the six leaf stage (V6), the same treatments were repeated as a spray on the soil surface. There were 12 treatments in total, and the total amount of nitrogen and SP-4 in each treatment ranged from 0 to 175 lbs/acre and 0 to 10 gallons/acre, respectively. Plot size was 15 ft×50 ft and each treatment was replicated four times in a randomized complete block design. Other field management methods followed best standard practices in use by farmers in each location.

At the Ohio site, $NH_3$ volatilization was measured in the 175 lbs N/acre urea treatment, with and without SP-4, one day post-application, using Drager tubes (Anonymous, 2011) and a modification of the methods described by Pacholski et al., 2006, and Watkins, 2013. Inverted cups placed on the soil surface were used to collect gas evolved. Each sampling event used two cups to collect ammonia ($NH_3$) volatilization over a 24 hour period in each plot. After 24 hours, a measurement was made of the $NH_3$ concentration in the cup. The concentration was averaged between the two cups to yield a mean volatilization value, in ppm, for each plot.

At the Wisconsin site, at corn grain maturity, grain was harvested from the middle of the plot with a combine. Nitrogen content in grain in lbs N/acre were analyzed and recorded. N content in the harvested grain was calculated by measuring the percent nitrogen in grain and multiplying by the grain yield for each treatment.

Analysis of variance (ANOVA) was conducted using the statistical software Minitab on each response variable.

A reduction in $NH_3$ volatilization was associated with SP-4 treatment of 5 gallons per acre, as shown in FIG. 12. In the control, mean $NH_3$ concentration at the soil surface was 5.51 ppm, but when treated with SP-4, the concentration was 4.28 ppm, a 22% reduction where SP-4 was applied. The p-value calculated by ANOVA was p=0.2. This result supports the claim that Ag-3FL reduces nitrogen losses due to ammonia volatilization.

Figure 13:
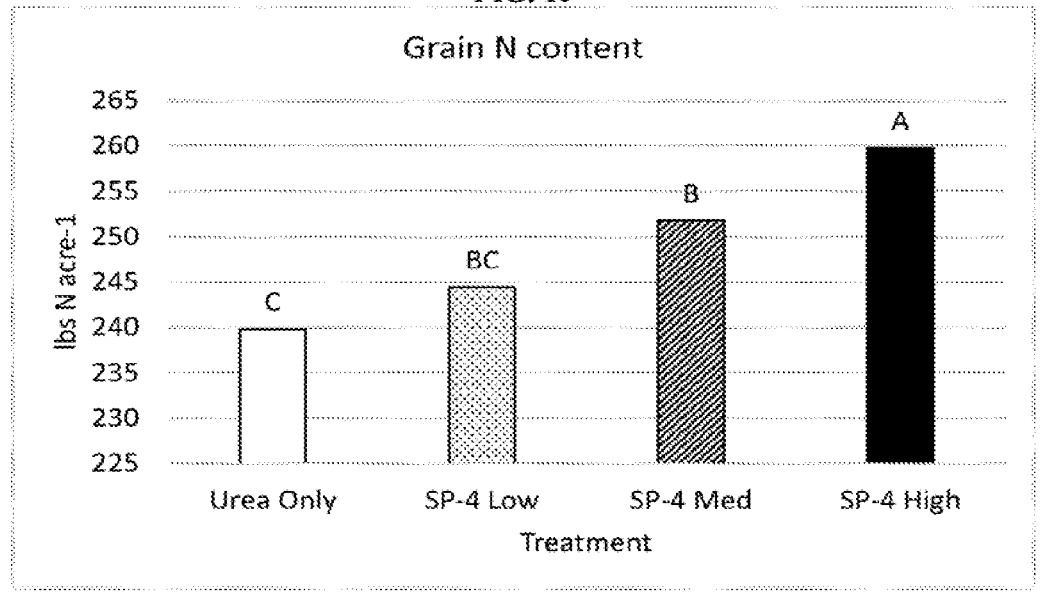
FIG. 13 shows the effect of a composition comprising the semi-humic material (i.e., SP-4) rate on N content in grain. Low, Medium and High refer to the 3 rates of SP-4 as described in Example 6. Treatments with different letters are significantly different by Fisher's LSD at the 5% level.

Nitrogen content in grain is shown in FIG. 13. There was a linear increase in grain nitrogen content in pounds per acre with increasing rate of SP-4. Compared to the urea-only control, the highest rate of SP-4 was associated with an increase in 19.9 pounds N per acre in the corn grain. This result was statistically significant at the 5% level.

References

Anonymous. 2011. Drager-tubes and CMS handbook. Drager Safety AG & Company. Lubeck, Germany.

Pacholski, A., G. Cai, R. Nieder, J. Richter, X. Fan, Z. Zhu and M. Roelcke. 2006. Calibration of a simple method for determining ammonia volatilization in the field—comparative measurements in Henan Province, China. Nutrient Cycling in Agroecosystems 74: 259-273.

Watkins, P. H. 2013. Nitrogen management in corn: Influences of urea ammonium nitrate (UAN) applications with and without nitrogen stabilizer products (Univeristy of Maryland Master thesis).

Example 7: Field Experiment in Soil without Crop to Measure Nitrogen Transformations and Leaching This experiment was conducted in a cultivated field with no corn or other plants growing. In this way, the effects of Ag-3FL on preventing nutrient depletion from soils could be examined without the additional factor of a crop growth and associated uptake of nutrients. The intention was to look at varying rates of Ag-3FL and nitrogen, while holding the ratio between them constant.

Experimental Layout

The experiment was conducted in a field in Sheridan, Ind. There were five treatments.

1. Water only (Control)
2. 4 gal/acre water with 100 lbs urea N/acre (Low Rate)
3. 4 gal/acre SP-4 with 100 lbs urea N/acre (Low Rate)
4. 100 gal/acre SP-4 with 2500 lbs urea N/acre (High Rate)
5. 100 gal/acre water with 2500 lbs urea N/acre (High Rate)

The low rate of urea N was in the range of a standard broadcast rate of nitrogen for field crops, particularly for a split application. The high rate was intended to simulate the rate that might be found in a banded application, where the farmer applied the liquid in a narrow band, which increases the concentration in the band. At the two urea N rates, the ratio of SP-4 to urea N was held constant.

The experimental design was a randomized complete block design with 4 replications. Prior to application, the soil was tilled as if being prepared for a corn planting, but the experiment was maintained crop-free and weed-free throughout. Plot size was 6 ft×10 ft with 4 ft buffers between each treatment. Within each plot, 2 liquid application bands were applied to the soil surface at a designated rate. Bands were applied with a hand-held boom with 2 nozzles spaced 60 inches apart. Each band was 10 feet long. Due to dry soil conditions, on day three a one-time, 0.25 inches simulated rainfall was applied to each plot with a hand held sprinkler and metering system.

Measurements $NH_3$ Gas Measurements. $NH_3$ volatilization was measured in each plot at ten days post-application to assess differences in $NH_3$ concentration at the soil surface, using the same method as described in Example 6.

Soil Cores. Soil cores were taken at 0-4" in depth in each plot at pre-treatment, then at 1-, 2-, 3-, 4-, 5- and 8-weeks post-application. For each sampling event, 3 cores were taken (a composite of both bands) and combined into one sample on-site for each plot. These samples were frozen then analyzed for nitrate ($NO_3^-$) concentration.

Nitrate Leaching Measurements Using Lysimeters. A total of 36 lysimeters (Soilmoisture Equipment Corporation, Goleta, Calif.) were installed. In each plot 2 lysimeters were installed, one each at a random location along each application band, except for the control treatment, where only one lysimeter was installed per plot. The depth of the lysimeter at the sampling point was 10 inches beneath the soil surface. There were eight total sampling events across nine weeks following application. During each sampling event, vacuum was applied to each lysimeter at 60 centibars, then 48 hours later liquid leachate was collected and analyzed for $NO_3^-$. Because leachate volumes are dependent on rainfall and soil water quantity, adequate sample volumes could not be extracted during every weekly sampling event. Adequate samples across treatments were obtained at Weeks 1, 3 and 9. This was attributed to a lack of significant rainfall during the middle part of the experiment. Each subsample was analyzed separately, and plot means were utilized for statistical analyses. Where ANOVA values were significant, Fisher's LSD test was employed to assess differences among treatment means.

Results

Figure 14:
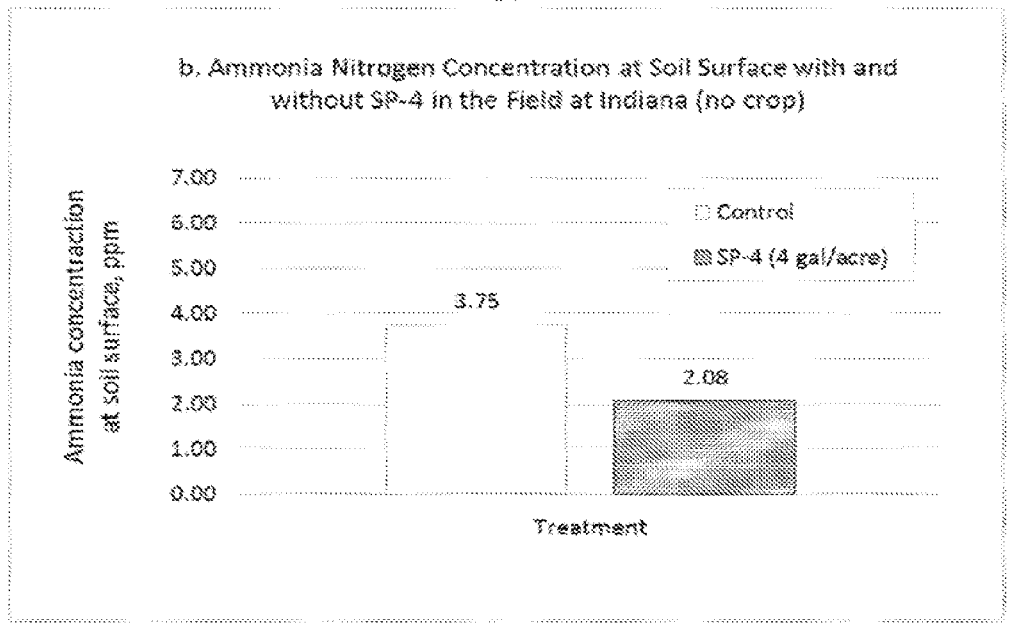
FIG. 14 shows the $NH_3$ volatilization reduction associated with treatment using a composition comprising the semi-humic material (i.e., SP-4) at the Indiana field location (no crop).

FIG. 14 illustrates the reduction in $NH_3$ gas release associated with SP-4. While the $NH_3$ concentration at the soil surface in the control treatment was 3.75 ppm, in the SP-4 treatment, it was 2.08, a 45% reduction in $NH_3$ loss. This result was significant by ANOVA (p=0.03). This supports the claim that Ag-3FL is associated with a reduction in nitrogen losses due to ammonia volatilization.

With respect to reduction in soil $NO_3^-$ (FIG. 15), for the first 1-2 weeks after application, soil nitrate levels were similar among the three treatments. As nitrification proceeded, the two treatments containing urea showed increased levels in soil $NO_3^-$ compared to the SP-4 treatment. At week 4 and Week 8, the SP-4 treatment had significantly lower soil nitrate levels vs. urea alone ($p \leq 0.05$, $p \leq 0.18$, respectively), while at Week 5, they were not significantly different.

Figure 15:
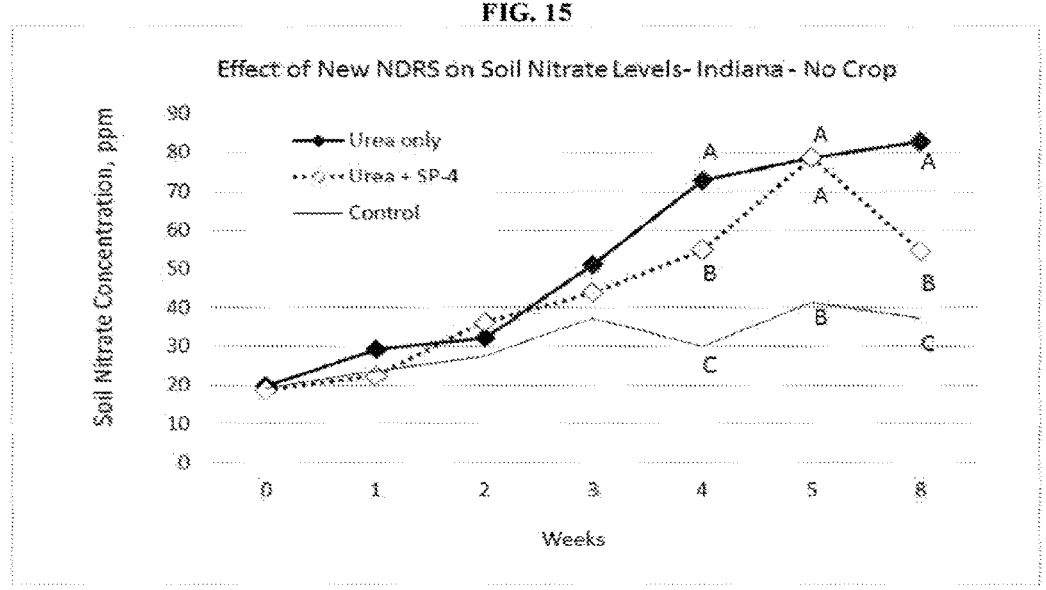
FIG. 15 shows the effect of a composition comprising the semi-humic material (i.e., SP-4) on reduction in soil $NO_3^-$ levels in Indiana (No crop). Treatment means labeled with different letters were significantly different within that sampling time (p-values show in the Example text).

The results from soil sampling depicted in FIG. 15 showed that SP-4 nitrate concentrations at Weeks 4 and 8 were approximately 20 ppm less than that of the Urea only treatment, a reduction of 25% or more. The fact that the effect was not significant at Week 5 appears due to variability in the SP-4 result. This supports the claim that Ag-3FL is associated with reduction in soil nitrate levels and therefore reduction in soil nitrate leaching losses.

Figure 16:
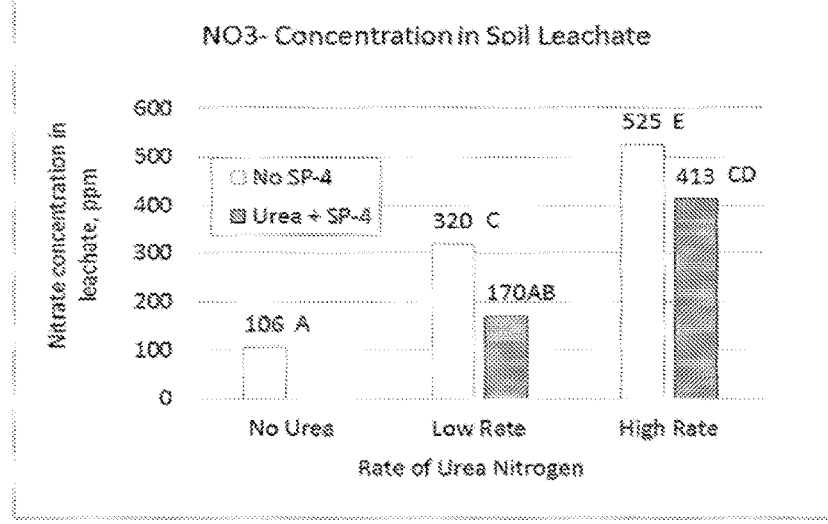
FIG. 16 shows the effect of a composition comprising the semi-humic material (i.e., SP-4) on nitrate leaching in a field without crops in Indiana, as measured by lysimeters. Data shown were taken 9 weeks after application. Means followed by different letters are significantly different by Fisher's LSD at the 5% level.

With respect to nitrate leaching, samples from Weeks 1 and 2 showed no significant differences among treatments. This was judged as due to the time required for urea to convert to nitrate and subsequently move downward in the soil profile. However, at Week 9, significant differences were observed among treatments FIG. 16. The mean nitrate concentration for the control treatment (without either urea or SP-4 application) was 106 ppm, while the level for the low rate of urea with SP-4 was 170 ppm. These two values were not significantly different by Fisher's test. At the low rate of urea, the SP-4 treatment significantly reduced nitrate leaching from 320 ppm to 170 ppm, while at the high rate of urea, SP-4 was again associated with reduced leaching (413 ppm with SP-4 vs 525 ppm without), also a statistically significant result. These results support the claim that AG-3FL reduces nitrate leaching in agricultural soils.

Example 8: Effect of AG-3FL and SP-4 on Pools of Nitrogen in the Soil

The effects of AG-3FL and SP-4 on soil nitrate concentration and microbial biomass carbon were tested in a controlled environment. It was contemplated that a one-time application of AG-3FL or SP-4, combined with nitrogen fertilizer, would lower soil nitrate concentration due to temporary accumulation of N as a result of enhanced soil microbial biomass.

Materials and Methods

A bioassay laboratory incubation was conducted during which a nitrogen fertilizer (ammonium sulfate equivalent to 100 lbs N $acre^{-1}$) was added to a pre-conditioned (14 days) soil, in comparison to the same soil applied with the same rate of N fertilizer, plus either AG-3FL at 0.2 gallons/acre or SP-4 at 4.0 gal $acre^{-1}$ (three treatments in total). The experiment included four replicates per treatment. The treatments were mixed with soil, placed in small cups, and the samples were incubated at 23° C. Subsamples were taken on days 7, 14, 28 and 42 after application and concentrations of nitrate and microbial biomass carbon in soil were measured. Microbial biomass was measured by the chloroform fumigation extraction method.

Results and Discussion

At 7 days after application, the soil nitrate concentration associated with the AG-3FL treatment, was 74.2 µg $NO_3^-$—N g $soil^{-1}$, a significant reduction ($p=0.10$) in comparison to the N-only control, which had a mean nitrate concentration of 82.1 µg $NO_3^-$—N g $soil^{-1}$. This represented a 9.6% reduction in soil nitrate concentration associated with AG-3FL (FIG. 20A). Moreover, at 14 days after application, AG-3FL was associated with a 73% increase in microbial biomass carbon. The N+AG-3FL treatment result was 158.6 µg-C g $soil^{-1}$, while the N-only treatment result was 91.6 µg-C g (FIG. 20B).

Figure 21A:
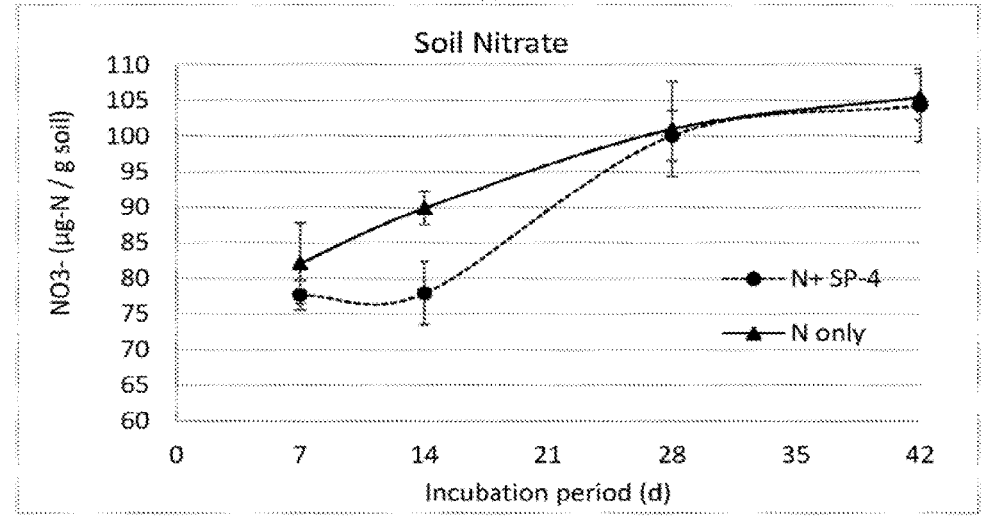
FIG. 21A shows soil nitrate concentrations at from 7 to 42 days after application (DAA) for SP-4 compared to the control. Both treatments received 100 lbs N/acre. At 14 DAA, the concentrations of nitrate were significantly different between the treatments at p=0.10. Standard errors are shown for each mean (n=4) at each sampling date.
Figure 21B:
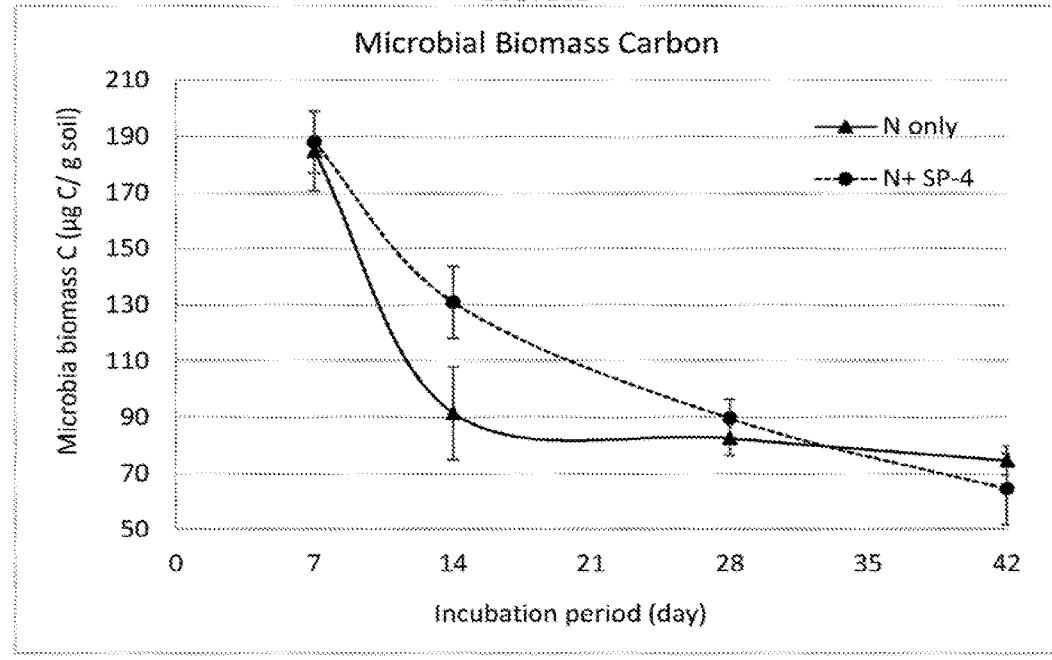
FIG. 21B shows soil microbial biomass carbon concentrations from 7 to 42 days after application (DAA) for SP-4 compared to the N-only control. Both treatments received 100 lbs N/acre. At 14 DAA, the treatments were significantly different at p=0.10. Standard errors are shown for each mean (n=4) at each sampling date.

In the same experiment, at 14 days after application, the soil nitrate concentration associated with the SP-4 treatment was 77.9 µg $NO_3^-$—N g $soil^{-1}$, in comparison to the N-only control, which had a mean of 89.8 µg $NO_3^-$—N g $soil^{-1}$, a 13.3% reduction, which was significant at $p=0.10$. At the same sampling date, SP-4 was associated with a significant ($p=0.10$) increase in microbial biomass carbon. Mean microbial biomass carbon was 130.9 µg-C g $soil^{-1}$ in the SP-4 treatment vs. 91.6 µg-C g $soil^{-1}$ in the N-only treatment (FIGS. 21A & 21B), an increase of 43%. This study supports the hypothesis that the mechanism for reduced soil nitrate concentrations was increased microbial immobilization of soil nitrate.

Example 9: Effect on Nitrate Levels and Nitrate Leaching on Fallow Ground

The following shows the effect of two compositions disclosed herein on nitrate levels in both the soil and the leachate. This experiment was conducted in a cultivated field with no crop growing so the effects of Ag-3FL and SP-4 could be examined without the effects of a growing crop affecting the Nitrogen cycling response.

Experimental Layout

The experiment was replicated across two locations (Frankfort, Ind. and Sheridan, Ind.). The following three treatments were employed:
1. Water only (Control)
2. 100 lbs urea ammonium nitrate (UAN) N/acre
3. 100 lbs UAN N/acre with 2.5 gal SP-4/100 lbs N The experimental design was a randomized complete block design with four replications. Prior to application, the soil was tilled as if being prepared for a corn planting. The plots were maintained vegetation-free for the duration of the experiment. Plot size was 6 ft×15 ft with 4 ft buffers between plots. Within each plot, two liquid application bands, each 10 inches wide, were applied with a hand-held boom with two nozzles spaced 60 inches apart and ran the 15 ft length of the plot. No irrigation was applied and the only water that the experiment received was supplied by ambient rainfall which was recorded daily.

Methodologies

Soil Cores

Soil cores were taken at two depths, 0 to 4 and 4 to 8 inch, in each plot at pre-treatment, then weekly thereafter for 10 weeks post-application. At each sampling event, six cores were taken (a composite of both bands in each plot) and combined into one sample on-site for each plot at each depth. Samples were frozen immediately then analyzed for nitrate concentration. An average of the two depths was the parameter utilized for analysis.

Nitrate Leaching Measurements using Lysimeters

Suction lysimeters (SoilMoisture Equipment Corporation, Goleta, Calif.) were installed to measure leachable nitrate. In each plot, two lysimeters were installed, one at random along each application band. The depth of the lysimeters was 10 inches beneath the soil surface, with the suction cup being placed directly below the application band. Samples were collected after rainfall events significant enough to produce sufficient volume of leachate. During each sampling event, vacuum was applied to each lysimeter at 60 centibars, then 24 to 48 hours later, liquid leachate was collected and analyzed for nitrates. Each subsample was analyzed separately, and plot means were utilized for statistical analyses.

Volatilization Measurements $NH_3$ and $NO_x$ gas volatilization was measured using the Drager tube method described in Example 5.

Statistical Analysis

Results for both soil and leachate nitrate were analyzed in a repeated measures ANOVA and Fisher's LSD test was employed to assess differences among treatment means.

Results

Figure 22:
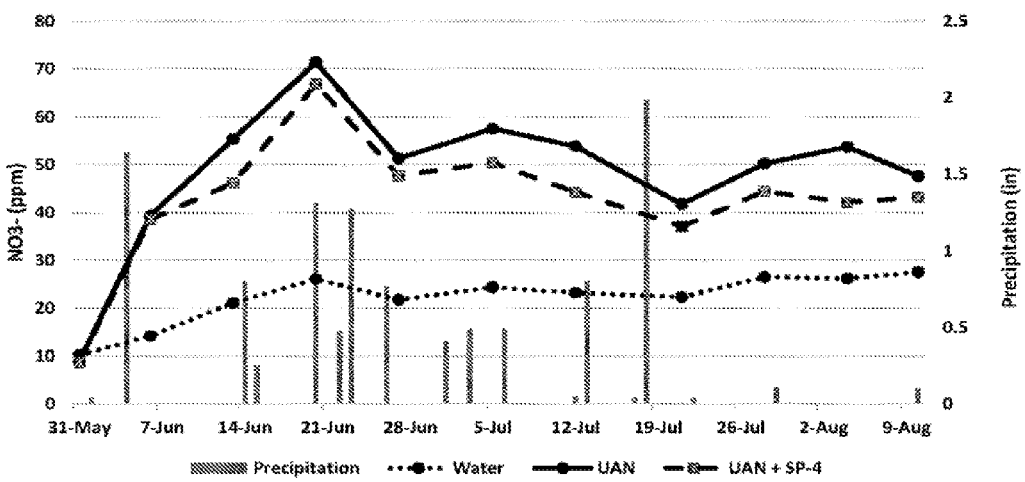
FIG. 22 shows that both soil nitrate and leachate concentrations were reduced when SP-4 was applied with UAN.

Both soil nitrate and leachate concentrations were reduced when SP-4 was applied with UAN. Soil data from Frankfort, Ind. found the addition of SP-4 was associated with a 12.3% decrease in soil nitrate concentrations. As illustrated in FIG. 22, the across-season soil nitrate averages for UAN and UAN+SP-4 (2.5 gal) were 52.2 and 45.8 ppm, respectively. This difference was maintained across the growing season ($P<0.01$).

Figure 23:
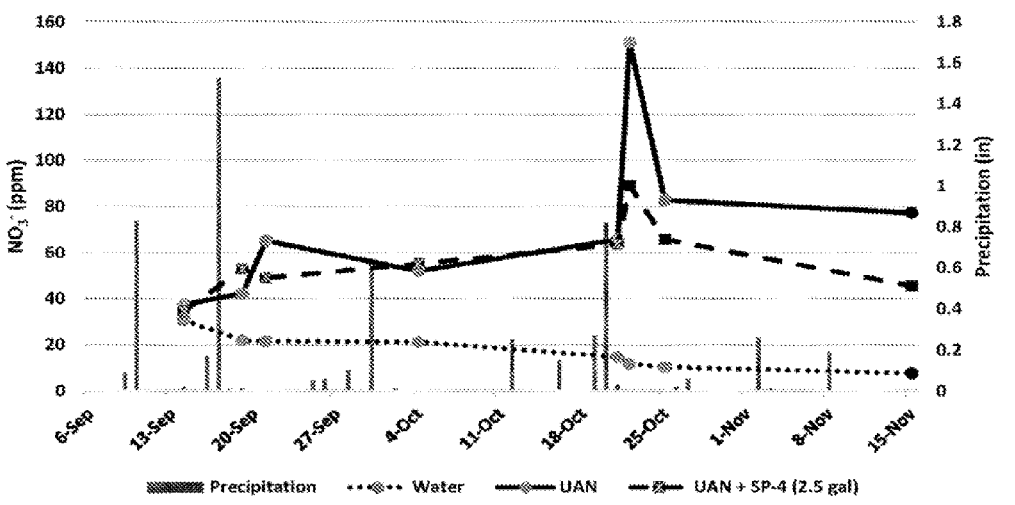
FIG. 23 shows leaching results measured from the lysimeters. This data confirms that SP-4 reduces soil nitrate concentrations and leaching losses.

Leaching results measured from the lysimeters also shows that SP-4 reduces soil nitrate concentrations and leaching losses (FIG. 23). At Sheridan, Ind. it was found that the addition of SP-4 was associated with a 27.2% reduction in nitrate concentration in the leachate. Season-long mean leachate concentrations for UAN and UAN+SP-4 (2.5 gal), were 85 and 61.9 ppm, respectively. Significant rainfall events were observed within the following two months. After both rainfall events, the treatment containing SP-4 had a lower concentration of nitrates than the UAN control. Mean nitrate concentrations the across entire the sampling period were significantly lower with SP-4 ($P<0.01$) than the UAN-control.

No significant differences were detected among the UAN and UAN+SP-4 treatments for either $NH_3$ or $NO_x$, therefore it was concluded that the nitrate reductions observed were not influenced by gaseous losses. This example clearly demonstrates that Ag-3FL and SP-4 consistently and effectively lower nitrate concentrations in the soil, and reduces subsequent leaching into the groundwater in an the soil of an agricultural site. The effect is clearly related to interactions in the soil associated with SP-4 application.

Example 10: Effects of SP-4 on Soil and Crop Nitrogen Pools in Corn

Materials and Methods

Site Selection and Treatment Application

Production fields for eight locations across the Corn Belt were selected. Type of fertilization application method (broadcast and/or knifed) differed somewhat across the eight locations, according to local practices. Nearly all nitrogen fertilizer was applied in the form of urea ammonium nitrate (UAN). Two applications used urea as the nitrogen source. Mean N fertilizer application across the eight locations was approximately 180 lbs N/acre. At time of nitrogen fertilization, SP-4 was tank mixed with the UAN on site accordingly to the treatment list below.

Treatments:

1) Grower Standard Practices (all management practices, including N fertilization rates, pest management, etc., according to the local practice for corn production at each specific site)

2) Grower Standard Practices+1.25 gal SP-4 per 100 pounds of applied nitrogen

3) Grower Standard Practices+2.50 gal SP-4 per 100 pounds of applied nitrogen

Soil Sampling

Once plot boundaries were established, a set of 9 or 12 points, depending on location, were selected within each of the treatment plots at each location. Soil was sampled from a 0 to 6 inch depth within one to two feet from each of the points. The soil from each of the treatment point locations were mixed together to form a composite soil sample from each treatment. A pre-treatment soil sample was taken from each treatment prior to any fertilization to establish baseline soil nitrate ($NO_3^-$) and ammonium ($NH_4^+$) concentrations. After each fertilizer application, soils were collected approximately one week post-application, and thereafter every two to three weeks during the growing season from the same marked locations for each treatment. Locations where a mid-season side dress of UAN was applied directly into the soil by a knife applicator soils samples were collected approximately 2 inches on either side of the application band. The composited soil samples were analyzed for nitrate and ammonium concentration.

Plant Dry Matter and Nitrogen Content Determinations

A total of 10 plants were collected from each plot at each location at approximately the R1 stage in corn. Plants were randomly collected within approximately 10 feet from the points determined for soil sampling. Individual plants were separated into leaf, stalk, and ear tissues for dry matter (DM) determinations. Then for each treatment, at each location, DM of each plant tissue for the collective 10 plants were weighed separately. The leaf, stalk, and ear tissue were chopped into small pieces and thoroughly homogenized. A subsample for each of the chopped tissues was collected and then weighed. The samples were dried and the dry weights recorded. Dried samples were ground and analyzed for percent nitrogen for each of the tissues collected. The individual locations were sampled as near as possible to the same corn developmental stage across locations. The individual dry weights for the individual plant tissues were then summed together to estimate the dry weight of an entire plant. The dry matter was multiplied by the nitrogen concentration to calculate nitrogen content.

Corn Yield

A hand harvest of 15 ears per treatment were randomly collected for each location near the locations where the plant samples were collected. Approximately five ears were taken from each of the point locations from the center of the field. The ears were analyzed for number of rows per ear and number of kernels per row for each treatment. Those values were combined to determine number of kernels per ear. The kernels were shelled from the cobs and weighed. The shelled corn was analyzed for percent moisture and test weight as that might have affected the total kernel weight of the 15 ears. This served to estimate corn yield in each plot.

Statistical Analysis

Data was analyzed as a randomized complete block design by analysis of variance (ANOVA), where individual locations (n=8) were considered replications (three treatments with eight replications each). Where there was a significant treatment effect detected by ANOVA, Fisher's LSD test was employed to assess differences among treatment means. Data was analyzed in Minitab 17.1.3.

Results and Discussion

Soil Nitrate, Ammonium, and Total Mineral N

Figure 24:
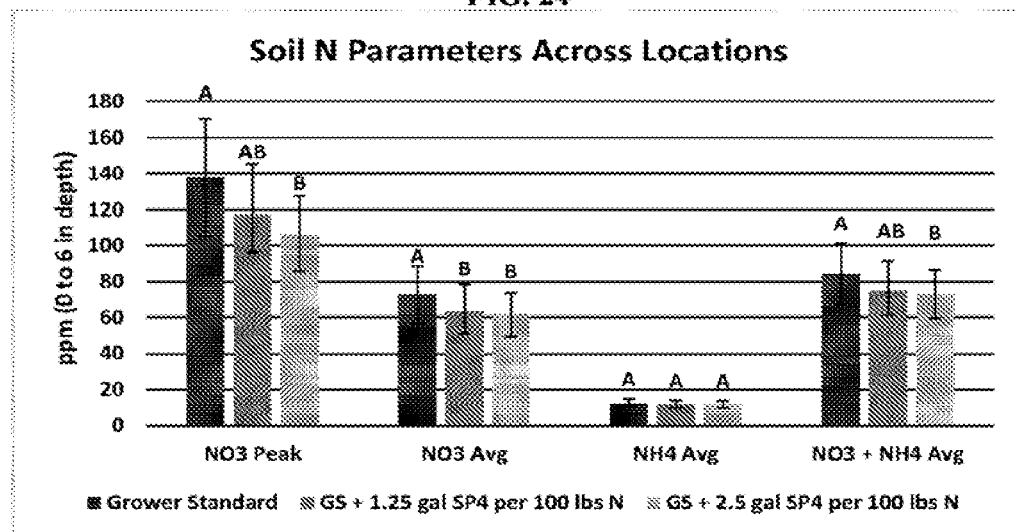
FIG. 24 shows soil nitrates at season peak concentrations along with season average soil nitrates soil ammonium and total soil mineral nitrogen (NO3−+NH4+). Letters that are different are significant at p≤0.05.

Across the eight locations, peak and season-long soil nitrate concentrations were reduced ($p \leq 0.05$) by 31 and 11.4 ppm, respectively, at the 2.5 gal SP-4 per 100 lbs N applied (FIG. 24). The 1.25 gal SP-4 per 100 lbs N applied reduced ($p \leq 0.10$) peak nitrate rates by 21 ppm while the season long average had a similar reduction to the 2.5 gal SP-4 rate, translating into a 15.1% and 22.7% reduction at the peak nitrate timing and a 13% and 15.6% season average nitrate reduction for the 1.25 and 2.5 gal rates. It is well-documented that soil nitrate concentrations are directly correlated to nitrate leaching. The season average ammonium was not different for the SP-4 treatments when compared to the grower standard treatment (FIG. 24). Lastly, when determining the season average soil mineral nitrogen (nitrate+ammonium) the model was significant at p≤0.08. The SP-4 treatments were either equal to or less than the grower standard (FIG. 24). This lower soil mineral N was a direct result of the lower soil nitrates.

Plant DM and Nitrogen Content

Across eight locations, each of the individual plant tissues exhibited a significant increase in dry matter. In other words, corn plants were larger when plots were treated with SP-4 at both rates. The grower standard averaged 134.1 g dry matter plant$^{-1}$ averaged over all locations compared the 153.4 and 163.4 g dry matter plant$^{-1}$ for the 1.25 and 2.5 gal rates, respectively (data not shown). These results were significantly different by ANOVA at p≤0.05.

Figure 25:
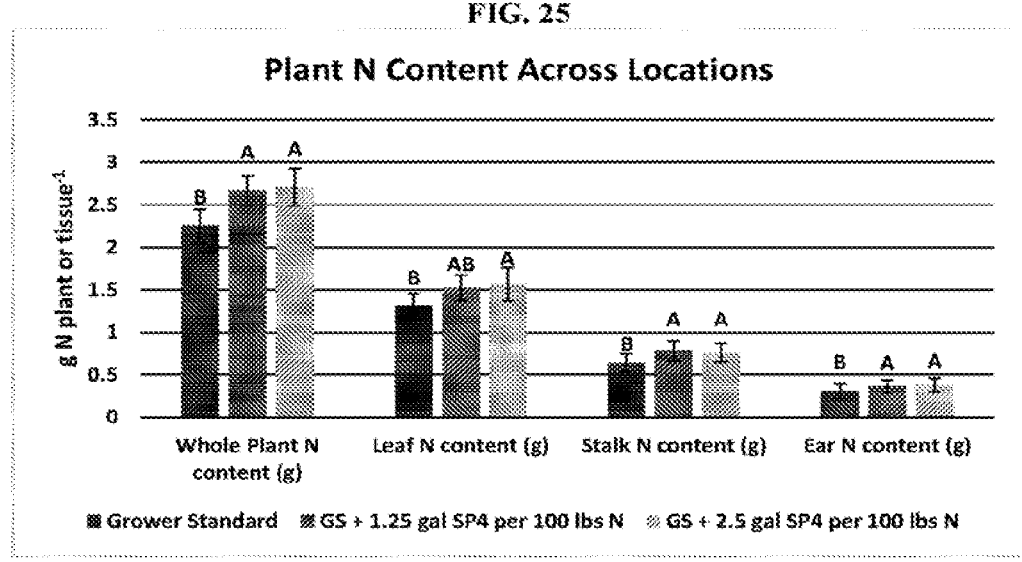
FIG. 25 shows plant N content from individual plant leaf, stem, or ear tissue and the whole plant shoot. Nitrogen content was tabulated from the plant DM and plant N concentration taken from 10 plants randomly collected from the center of each treatment near the points that were used for soil sampling and then averaged on a per tissue or whole plant basis. Letters that are different are significant at p≤0.05.

SP-4 treatments also resulted in greater N content across individual tissues as a direct result of conserved soil nitrogen and resulted in an increase in dry matter. These differences when combined at the whole plant level produced a difference of 2.7 g N plant$^{-1}$, a 19% increase over the grower standard (FIG. 25).

Corn Yield

Figure 26:
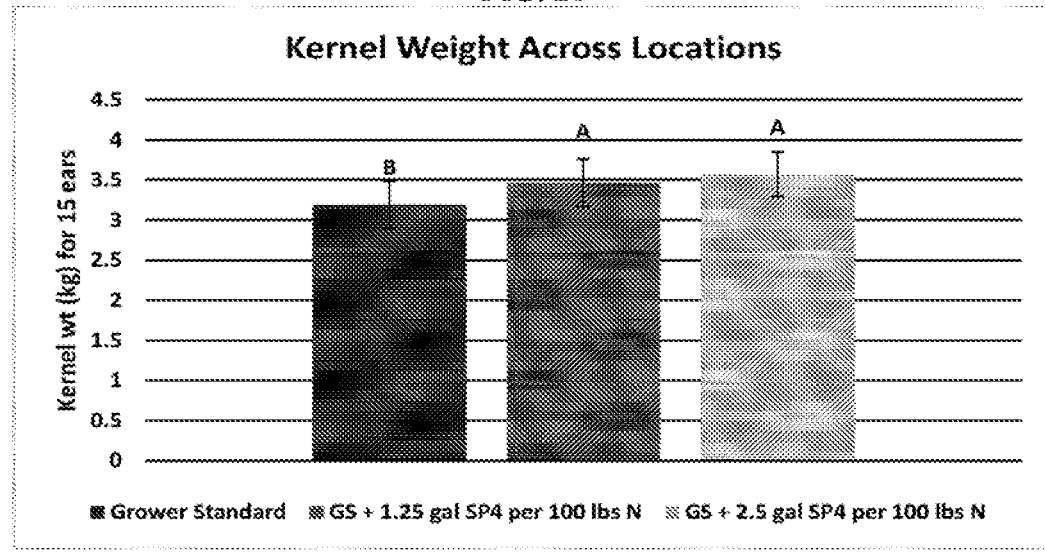
FIG. 26 shows kernels weight by treatment for 15 hand sampled ears randomly collected from the center of each plot near the points that were used for soil sampling. Letters that are different are significant at p≤0.05.

When averaged across all 15 ears the 1.25 and 2.5 gal SP-4 rates had an additional 0.27 and 0.38 kg of weight (p≤0.05) than the grower standard due to the additional kernels filled at the end of each row (FIG. 26). This represents an 8.4 and 11.9% increase over the grower standard.

When taken as a whole, this example demonstrates that, across eight locations, treatment with SP-4 results in reduced soil nitrate concentrations, a significant increase in the pool of nitrogen contained in the corn dry matter, and increased corn growth and yield.

What is claimed is:

1. A semi-humic material obtained by a process comprising:
   (a) heating an aqueous composition comprising leonardite ore and an organic acid salt to provide a first liquid portion having a fulvic acid fraction and a first solid portion;
   (b) separating the first liquid portion from the first solid portion;
   (c) adjusting the pH of the first liquid portion to about 8.5 or above; and
   (d) aging the first liquid portion for at least about 45 days at a temperature of 80-85° F. while allowing the first liquid portion to separate, providing a second liquid portion having an increased fulvic-like component acid fraction and a second solid portion, wherein the pH of the second liquid portion is not adjusted and has a pH of from about 5 to about 7;
   and further wherein the fulvic-like fraction of the second liquid portion shows a percentage increase of carbon of at least about 5% by weight compared to the fulvic acid fraction of the first liquid portion.

2. The semi-humic material of claim 1, wherein the fulvic-like component of the second liquid portion is at least about 20% by weight greater on a carbon basis than the fulvic-like component of the first liquid portion.

3. The semi-humic material of claim 1, wherein the process further comprises separating the second solid portion from the second liquid portion.

4. The semi-humic material of claim 1, wherein in step (c), the pH of the first liquid portion is about 8.5.

5. The semi-humic material of claim 1, wherein the pH of the aqueous composition of step (a) is from about 5 to about 7.

6. The semi-humic material of claim 1, wherein the organic acid salt is a sodium, potassium, ammonium, copper, iron, magnesium, manganese, zinc, calcium, lithium, rubidium or cesium salt of ethylene diamine tetraacetic acid, hydroxyethylene diamine triacetic acid, diethylene triamine pentaacetic acid, nitrillo triacetic acid, ethanol diglycine, citric acid, galactaric acid, gluconic acid, glucoheptoic acid, glucaric acid, glutaric acid, glutamic acid, tartaric acid or tartronic acid.

7. The semi-humic material of claim 1, wherein the pH of the second liquid portion is from about 5 to about 9.

8. An aqueous composition comprising the semi-humic material of claim 1, and at least one additional humic extract from leonardite.

9. The aqueous composition of claim 8, wherein the aqueous composition comprises from about 1% to about 10% by weight the semi-humic material of claim 1.

10. The aqueous composition of claim 9, wherein the aqueous composition comprises the additional humic extract in an amount from about 30% to about 99% by weight.

11. A method of reducing nitrate leaching into soil, comprising applying the semi-humic material of claim 1 to soil.

12. The method of claim 11, wherein the semi-humic material is applied to the soil as an aqueous composition comprising the semi-humic material at a rate of 5-15,000 liters per hectare.

13. The method of claim 12, further comprising applying a fertilizer to the soil.

14. A method of reducing phosphorus and/or ammonium runoff from soil, comprising applying the semi-humic material of claim 1 to soil.

15. The method of claim 14, further comprising applying a fertilizer to the soil.

16. The method of claim 14, wherein the fertilizer is diammonium phosphate.

17. The method of claim 14, wherein water is applied to the soil with the semi-humic material.

* * * * *